(12) United States Patent
Osae et al.

(10) Patent No.: US 9,074,112 B2
(45) Date of Patent: Jul. 7, 2015

(54) METHACRYLATE-BASED ADHESIVE COMPOSITIONS

(75) Inventors: Samuel Boadu Osae, Cary, NC (US); Steven Lochiel Brown, Northampton (GB); Roy Gordon Phillipps, Turvey (GB)

(73) Assignee: Scott Bader Company Limited, Northamptonshire (GB)

( * ) Notice: Subject to any disclaimer, the term of this patent is extended or adjusted under 35 U.S.C. 154(b) by 70 days.

(21) Appl. No.: 13/575,092

(22) PCT Filed: Feb. 24, 2011

(86) PCT No.: PCT/GB2011/000256
§ 371 (c)(1),
(2), (4) Date: Jul. 25, 2012

(87) PCT Pub. No.: WO2011/104510
PCT Pub. Date: Sep. 1, 2011

(65) Prior Publication Data
US 2012/0302695 A1 Nov. 29, 2012

Related U.S. Application Data

(60) Provisional application No. 61/308,389, filed on Feb. 26, 2010.

(30) Foreign Application Priority Data

Apr. 16, 2010 (GB) .................................. 1006427.7

(51) Int. Cl.
C09J 175/14 (2006.01)
C09J 151/04 (2006.01)
C09J 4/06 (2006.01)
C09J 123/28 (2006.01)

(52) U.S. Cl.
CPC *C09J 4/06* (2013.01); *C09J 175/14* (2013.01); *C09J 151/04* (2013.01); *C09J 123/286* (2013.01)

(58) Field of Classification Search
CPC ........ C08J 4/06; C08J 123/286; C08J 151/04; C08J 175/14
USPC ........................................................ 523/201
See application file for complete search history.

(56) References Cited

U.S. PATENT DOCUMENTS

| | | | |
|---|---|---|---|
| 3,832,274 A | 8/1974 | Owston | |
| 3,873,640 A | 3/1975 | Owston et al. | |
| 3,891,523 A * | 6/1975 | Hisamatsu et al. | ............. 522/96 |
| 5,206,288 A | 4/1993 | Gosiewski et al. | |
| 5,859,160 A | 1/1999 | Righettini et al. | |
| 5,932,638 A | 8/1999 | Righettini et al. | |
| 6,433,091 B1 | 8/2002 | Cheng | |
| 6,462,126 B1 | 10/2002 | Gosiewski et al. | |
| 2005/0100662 A1 | 5/2005 | Ohba et al. | |
| 2008/0302479 A1 | 12/2008 | Barker et al. | |
| 2009/0012202 A1 | 1/2009 | Jacobine et al. | |

FOREIGN PATENT DOCUMENTS

| | | |
|---|---|---|
| CN | 101392153 | 3/2009 |
| CN | 101463235 | 6/2009 |
| CN | 101705057 | 5/2010 |
| CN | 101735735 | 6/2010 |
| DE | 4328960 | 3/1995 |
| EP | 0357304 | 3/1990 |
| EP | 0641846 | 3/1995 |
| EP | 0962509 | 12/1999 |
| EP | 1448738 | 8/2004 |
| EP | 0941261 | 5/2005 |
| EP | 1256615 | 5/2006 |
| EP | 1453925 | 10/2006 |
| EP | 1086185 | 5/2007 |
| EP | 1845141 | 10/2007 |
| EP | 1427790 | 10/2009 |
| EP | 2135904 | 12/2009 |
| EP | 2177553 | 4/2010 |
| JP | 2001/302907 | 10/2001 |
| WO | WO 00/32688 | 6/2000 |
| WO | WO 03/040248 | 5/2003 |
| WO | WO 2005/040295 | 5/2005 |
| WO | WO 2007/068625 | 6/2007 |
| WO | WO 2007/076108 | 7/2007 |
| WO | WO 2008/151849 | 12/2008 |
| WO | WO 2010/043707 | 4/2010 |

* cited by examiner

*Primary Examiner* — Vickey Nerangis
(74) *Attorney, Agent, or Firm* — Swanson & Bratschun, L.L.C.

(57) ABSTRACT

An adhesive composition, especially suitable for a two-part adhesive system curable via free radical polymerization comprises; (A) (meth)acrylate ester monomer; (B) chlorinated elastomeric polymer; (C) core-shell impact modifier; and (D) urethane (meth)acrylate oligomer. Example adhesive compositions include urethane (meth)acrylate oligomer (D) derived from (i) a di- or higher isocyanate having at least two isocyanate groups which differ in reactivity; (ii) a chain-extending reagent which has at least two groups selected from hydroxyl and/or amino groups, each capable of reaction with an isocyanate group of (i); (iii) a hydroxymethacrylate component or hydroxyacrylate component. Also urethane (meth)acrylate oligomers, suitable for use in adhesive compositions, and derived from: (i) a diisocyanate having two isocyanate groups which differ in reactivity; (ii) a chain-extending reagent which is a polyether polyol selected from ethoxylated and propoxylated derivatives of tri- and tetra-functional polyols; and (iii) a hydroxyl (meth)acrylate selected from polyethylene glycol (meth)acrylate and polypropylene glycol (meth)acrylate, are disclosed.

13 Claims, No Drawings

METHACRYLATE-BASED ADHESIVE COMPOSITIONS

This application is a 35 U.S.C. §371 national phase application of PCT/GB2011/000256, filed Feb. 24, 2011 (WO 2011/104510), entitled "Methacrylate-Based Adhesive Compositions." PCT/GB2011/000256 claims priority to U.S. provisional application Ser. No. 61/308,389, filed Feb. 26, 2010 and Great Britain application serial no. 1006427.7, filed Apr. 16, 2010, each of which is incorporated herein by reference in its entirety.

Polymerizable vinyl adhesive compositions that are useful for a variety of adhesive, coating, filling, repair and related applications are well known in the art. Prior art compositions include formulations based on acrylate and methacrylate monomers, styrene monomer and styrene derivatives as well as polyester and vinyl ester resins.

The compositions are generally liquids or pastes that polymerize to a solid mass when two separately packaged components, one of which contains a polymerization initiator, generally a peroxide, and the other of which contains a promoter, generally an amine, are mixed just prior to use. The polymerisation process is generally referred to as "curing" by those skilled in the art, with different combinations of initiators and promoters being referred to as different "cure systems".

A particularly useful group of polymerizable vinyl compositions comprises mixtures of dissolved or dispersed polymers in acrylate or methacrylate monomers. Such compositions can provide a number of performance benefits for adhesive bonding and related applications, including high bond strength, adhesion to a variety of materials with minimal surface preparation, and rapid curing. Methyl methacrylate is a preferred monomer for these adhesives because it is relatively low in cost and provides high strength properties in formulated compositions. This group of polymerizable compositions is recognized by those skilled in the art as being superior in many respects to those based on polyester resins and vinyl ester resins, particularly in terms of their ductility and adhesion to a variety of material surfaces.

Methacrylate-based adhesives, in their simplest form, have been known for several decades. Such adhesives consisted primarily of solutions of thermoplastic elastomers or rubbers in methacrylate ester monomers, especially in methyl methacrylate. Early examples of this type may be found in U.S. Pat. No. 3,832,274, which discloses solutions of butadiene-containing elastomers, along with a variety of other copolymers, in a methacrylate monomer solution. Such polymer-in-monomer solution adhesives were later improved by the addition of particulate core-shell graft copolymers (see, for example, EP0357304), which swell in the methacrylate monomer but do not dissolve therein and yield improvements in, amongst other things, the impact strength of joints bonded with the adhesive.

Over the years, quite a variety of copolymers and elastomers has been used in formulating these types of radically curable methacrylate-based adhesives. This variety recognises one of the primary problems with such products, namely that an adhesive that bonds well to one type of substrate, such as a metal, usually does not bond so well to another type, such as a thermoplastic. This not only creates inconvenience for fabricators in having to maintain stocks of different adhesive products for the bonding of different substrate types, it creates major difficulties when two dissimilar substrates are to be joined together, for instance a fibre-reinforced polyester and a metal. An adhesive which may well demonstrate excellent bonding to the polyester may also prove deficient in its adhesion to the metal, and so the overall adhesive joint is weaker.

It would therefore be very advantageous to fabricators to have available to them a single adhesive which gave good bond strength to a wide variety of substrates, including metals (aluminium, stainless steel, galvanised steel, etc), thermoset plastics (such as glass reinforced polyester) and thermoplastics (including acrylic, PVC, ABS and the like). It would be further advantageous if such a wide-ranging adhesive was also capable of maintaining its bond strength if the joint was subjected to an aggressive environment, such as a corrosive or a high temperature environment.

European patent 1,448,738 attempts to provide an adhesive for a variety of substrates by using a combination of a chlorinated polymer and a nitrogen-containing elastomer within the formulation. Example nitrogen-containing elastomers include nitrile elastomer polymers and thermoplastic polyurethanes. The adhesives of this disclosure are shown to bond to a wide range of substrates, especially glass reinforced polyester ones, even at elevated temperature, but this document is silent on the subject of adhesive performance in corrosive environments.

A further issue that can also force fabricators to employ more than one type of adhesive is that of the thickness of the adhesive bond itself. In general, the larger the size of the components to be bonded, the larger the gap between these two components in the final joint, i.e. the layer of adhesive bonding the two components is thicker. Adhesives curing by a free radical mechanism, however, generate heat during the curing stage, as a result of the exothermic free radical reaction. If the curing adhesive becomes too hot, unreacted components within it (especially any methyl methacrylate monomer not yet reacted) may boil, resulting in gassing or void formation within the adhesive joint itself, which in turn gives rise to a weaker bond. This gassing may also cause the adhesive to foam and expand outside of the joint area, which then requires the fabricator to spend time trimming off the excess expansion and making good the appearance of the joint.

Techniques exist for reducing the exotherm generated by the curing reaction (for instance, reducing the amount of amine promoter employed in effecting the cure, or incorporating exotherm-suppressing additives such as α-methylstyrene into the adhesive) but these can sometimes lead to other problems, especially when using thin layers of adhesive to bond smaller components. It is often the case, for example, that some exotherm is desirable to accelerate the later stages of the curing reaction, giving development of full bond strength within a shorter, more practical, period of time.

Exotherm-suppressing techniques can also increase the tendency for undesirable side reactions (especially air-inhibition of cure, discussed in U.S. Pat. Nos. 5,859,160 and 5,932,638) to compete with the curing reaction and these may also result in a weaker adhesive bond. It can therefore be the case that adhesives which cure well in thin sections may demonstrate undesirable boiling and void formation within thick sections, whilst adhesives which perform well in thick sections may be found deficient when used in thinner layers.

In recent years, reactive resins of various kinds have been incorporated into the basic methacrylate monomer+elastomer/rubber+core-shell impact modifier type of adhesive. PCT application WO2005/040295 discloses the use of an unsaturated polyester or vinyl ester resin in combination with a thermoplastic or partially thermoplastic polymer or elastomer, an acrylate or methacrylate monomer and a core-shell impact modifier, the combination offering better control of the exotherm associated with free radical cure and therefore minimising defects that arise from this exotherm. The adhesives of WO'295 are shown to bond well to fibre-reinforced polyester and also to aluminium, even at high temperature, but adhesion to thermoplastic substrates is not demonstrated, nor is the behaviour of the adhesive bond to aluminium when the joint is exposed to a corrosive environment.

Instead of the unsaturated polyester or vinyl ester resins of WO'295, the disclosures of PCT application WO2007/068625 employ a methacrylated polyurethane as a reactive resin, in combination with a carboxylated butadiene-nitrile rubber. This results, in particular, in improved fracture toughness of the adhesive at sub-ambient temperatures. Data are presented for adhesive bond strengths to aluminium and to a variety of thermoplastic substrates, but this document is silent on the subject of adhesive performance when bonding a thermoset plastic substrate such as reinforced polyester. Furthermore, as is also the case in WO'295, the bonded aluminium joints are not subjected to a corrosive environment.

Consequently, there remains a need within the art for improvements in methacrylate-based adhesives, towards adhesives that exhibit an enhanced combination of properties and especially adhesives that will bond well to a broad range of substrates including metallic, thermoplastic and thermosetting substrates. The invention also seeks to provide adhesive compositions capable of providing excellent adhesion when applied in both thin layers and thick sections. Furthermore the invention aims to provide adhesive compositions capable of forming adhesive bonds that are resistant to corrosive environments. Such adhesive compositions could be especially useful for marine applications.

Surprisingly, the inventors have found that such improvements may be realised through a two-part adhesive composition, curable via free radical polymerisation which comprises:
(A) (meth)acrylate ester monomer;
(B) chlorinated elastomeric polymer;
(C) core-shell impact modifier; and
(D) urethane (meth)acrylate oligomer.
(The term "(meth)acrylate" is extensively used within the art to denote "acrylate or methacrylate" and this well-known abbreviation will be used throughout).

Accordingly, in a first aspect the invention provides an adhesive composition, curable via free radical polymerisation, the composition comprising:
(A) (meth)acrylate ester monomer;
(B) chlorinated elastomeric polymer;
(C) core-shell impact modifier; and
(D) urethane (meth)acrylate oligomer.

In a preferred embodiment an adhesive composition comprises, based on the total weight of components (A), (B), (C) and (D):
from 20% to 70% (meth)acrylate ester monomer(s) (A);
from 1 to 35% chlorinated elastomeric polymer(s) (b);
from 1 to 35% core-shell impact modifier(s) (C); and
from 1 to 40% urethane (meth)acrylate oligomer(s) (D).

In a second aspect the invention comprises a two part system for an adhesive.

According to a first embodiment of this second aspect, the two part system comprises:
(i) a first part containing an adhesive composition which comprises the following components:
(A) (meth)acrylate ester monomer;
(B) chlorinated elastomeric polymer;
(C) core-shell impact modifier;
(D) urethane (meth)acrylate oligomer; and
(ii) a second part containing at least one component capable of initiating and/or promoting free radical polymerisation of components in the first part.

According to a second embodiment of this second aspect, the two part system comprises first and second parts which, in combination contain the aforementioned components (A), (B), (C) and (D), together with:
(I) a component capable of initiating the free radical polymerisation of components (A) to (D); and
(P) a component capable of promoting the polymerisation, provided that (I) and (P) are contained in different respective parts of the two part system.

According to embodiments of the invention an adhesive composition contains as a component (D) a urethane (meth)acrylate oligomer derived from at least the following components:
(i) an isocyanate having at least two isocyanate groups which differ in their reactivity;
(ii) a chain-extending reagent which has at least two groups selected from hydroxyl groups and amino groups; and
(iii) a hydroxymethacrylate or a hydroxyacrylate.

Preferably a urethane (meth)acrylate oligomer is derived from a chain extending reagent which has at least three groups selected from hydroxyl groups and amino groups. Thus, it is particularly preferred to employ a branched chain-extending reagent (ii).

In particularly preferred embodiments a urethane (meth) acrylate oligomer is derived from a cycloaliphatic, araliphatic or aromatic diisocyanate, and is especially derived from isophorone diisocyanate or 2,4 toluene diisocyanate.

Preferred examples of chain extending reagents (ii) include polyether polyols and polyester polyols and especially polyols which have at least three free hydroxyl groups available for reaction with isocyanate groups of isocyanate (i).

Especially preferred polyether polyols are selected from ethoxylated and propoxylated derivatives of tri- or higher functional polyols, preferably tri- and tetra-functional polyols. Examples include ethoxylated and/or propoxylated derivatives of trimethylol propane and ethoxylated and/or propoxylated derivatives of pentaerythritol and ethoxylated and/or propoxylated derivatives of glycerol; derivatives of trimethylolpropane and pentaerythritol are especially preferred. Such polyether polyols may preferably contain from 3 to 20 units of ethylene oxide (EO), propylene oxide (PO), or combinations thereof, and more preferably from 3 to 10 units.

Additional preferred polyols include those obtainable by polymerisation of a lactone, especially a lactone comprising a 5-, 6- or 7-membered ring and more especially ϵ-caprolactone, including alkyl substituted derivatives thereof. Typically the polymerisation is effected in the presence of a tri- or higher polyfunctional alcohol, especially a sugar alcohol.

In particularly preferred embodiments a chain-extending reagent (ii) is derived from ϵ-caprolactone and a sugar alcohol, preferably sorbitol.

Some preferred embodiments of the invention employ a urethane (meth)acrylate oligomer derived from (iii) a hydroxymethacrylate or a hydroxyacrylate. Some particularly preferred embodiments may employ hydroxyethylacrylate. A hydroxymethacrylate or hydroxyacrylate component is preferably employed in combination with a polyester polyol chain-extending reagent (ii) as described above.

Additional preferred embodiments employ a polyethylene glycol (meth)acrylate or a polypropylene glycol (meth)acrylate, and especially methacrylates comprising from 3 to 10 units of ethylene oxide (EO), propylene oxide (PO) or combinations thereof. A polyethylene glycol methacrylate or polypropylene glycol methacrylate containing 5 to 6 units selected from ethylene oxide, propylene oxide or combination thereof are especially preferred.

A polyethylene glycol (meth)acrylate and/or polypropylene glycol (meth)acrylate is preferably employed in combination with a polyether polyol chain-extending reagent, as described above.

Particularly preferred embodiments may contain a blend of two or more urethane (meth)acrylate monomers as component (D).

According to the third aspect the invention provides a urethane (meth)acrylate oligomer suitable for use in an adhesive composition according to the first aspect and also in a two part system according to the second aspect.

A urethane (meth)acrylate oligomer according to a third aspect of the present invention is derived from at least the following components:
  (i) a diisocyanate having two isocyanate groups which differ in reactivity;
  (ii) a chain-extending reagent which is a polyether polyol selected from ethoxylated and propoxylated derivatives of tri- and tetra-functional polyols and especially ethoxylated and propoxylated derivatives of trimethylol propane and ethoxylated and propoxylated derivatives of pentaerythritol; and
  (iii) a hydroxy(meth)acrylate selected from polyethylene glycol (meth)acrylate and polypropylene glycol (meth) acrylate.

It has surprisingly been found that such new urethane (meth)acrylate oligomers are especially suitable for enhancing the properties of the present adhesive compositions.

In particular, new urethane (meth)acrylate oligomers according to the third aspect of the invention are capable of providing enhanced adhesion to selected substrates, including thermoplastics.

The new urethane (meth)acrylate oligomers are obtainable by reaction of:
  (i) a diisocyanate having two isocyanate groups which differ in reactivity;
  (ii) a chain-extending reagent which is a polyether polyol selected from ethoxylated and propoxylated derivatives of tri- and tetra-functional polyols; and
  (iii) a hydroxy(meth)acrylate selected from polyethylene glycol (meth)acrylate and polypropylene glycol (meth) acrylate.

Preferred example urethane (meth)acrylate oligomers are obtainable by reaction of (i) diisocyanate, (ii) polyol and (iii) hydroxy(meth)acrylate in proportions such that the polyol (ii) provides enough hydroxyl groups to react with approximately 50% of the isocyanate groups of the diisocyanate, and the hydroxy(meth)acrylate (iii) provides enough hydroxyl groups to react with the other 50% of the isocyanate groups of the diisocyanate.

In particularly preferred embodiments a new urethane (meth)acrylate oligomer is obtained by reaction of (i) diisocyanate and (iii) hydroxy methacrylate and subsequent reaction of the product with the full amount of polyol (ii). Within these particularly preferred embodiments, the relative proportions of (i) diisocyanate, (ii) polyol and (iii) hydroxy (meth)acrylate are chosen such that the ratio of equivalents of NCO in the diisocyanate to equivalents of OH in the hydroxy (meth)acrylate lies within the range 1.90:1 to 2.30:1, more preferably from 2.00:1 to 2.25:1, most preferably from 2.10:1 to 2.20:1, and the ratio of equivalents of NCO in the diisocyanate to equivalents of OH in the polyol lies within the range 1.90:1 to 2.20:1, more preferably from 1.95:1 to 2.10:1, most preferably from 1.98:1 to 2.06:1.

The following prior art documents disclose urethane (meth)acrylate oligomers obtained by reaction of a polyisocyanate with both a polyol and a hydroxy (meth)acrylate component: EP-A-0962509, US2009/0012202, EP-A-1845141 and US2005/0100662.

Typically the oligomers are obtained by reacting an isocyanate-terminated urethane prepolymer (obtained by reacting a polyol with a polyisocyanate) with a hydroxy-group containing (meth)acrylate. The majority of the example oligomers are derived from 2-hydroxyethyl methacrylate or 2-hydroxyethyl acrylate. None of the above documents disclose a urethane (meth)acrylate oligomer derived from (ii) a polyether polyol selected from ethoxylated and propoxylated derivatives of tri- and tetra-functional polyols; and (iii) a hydroxy (meth)acrylate selected from polyethylene glycol (meth)acrylate and polypropylene glycol (meth)acrylate.

Preferred examples of diisocyanates (i), polyetherpolyol chain-extending reagents (ii) and polyethylene glycol methacrylates/polypropylene glycol methacrylates (iii) are discussed in more detail below. In this regard, the optional and preferred features of the first and any of the other aspects herein may also apply, singly or in any combination, to the third aspect of the invention.

Further aspects of the invention concern the use of a urethane (meth)acrylate oligomer as defined in the accompanying claims in an adhesive composition comprising (A) (meth)acrylate ester monomer; (B) chlorinated elastomeric polymer and (C) core shell particles.

Furthermore, the invention provides for the use of a urethane (meth)acrylate oligomer for enhancing resistance to corrosive environments for an adhesive composition containing (A) (meth)acrylate ester monomer; (B) chlorinated elastomeric polymer and (C) core-shell particles.

Thus the invention provides for the use of an adhesive composition comprising components (A), (B), (C) and (D) defined above in marine applications.

Embodiments of the various aspects of the present invention will now be described further by way of example.

DETAILED DESCRIPTION OF EMBODIMENTS OF THE INVENTION (Meth)acrylate Ester Monomer A (meth)acrylate ester monomer for component (A) may be any ester of acrylic acid or methacrylic acid known to the art. Examples are esters of $C_1$-$C_6$ monofunctional alcohols with (meth)acrylic acid, (such as methyl acrylate, methyl methacrylate, ethyl acrylate or methacrylate, n-propyl or iso-propyl acrylates or methacrylates, butyl (meth)acrylates (all isomers)) and hexyl (meth)acrylates, esters of higher molecular weight alcohols having up to about 12 carbon atoms (such as lauryl (meth)acrylate, 2-ethylhexyl (meth)acrylate, hexyl (meth)acrylate, isodecyl (meth)acrylate and the like), esters of cycloaliphatic alcohols (such as cyclohexyl (meth)acrylate), hydroxy-functional (meth)acrylate esters of di/poly-functional alcohols (such as hydroxyethyl (meth)acrylate, hydroxypropyl (meth)acrylate or pentaerythritol tri(meth) acrylate), di/poly-esters of di/poly-functional alcohols (such as ethylene glycol di(meth)acrylate, 1, 3 or 1,4-butanediol di(meth)acrylate, 1,6-hexanediol di(meth)acrylate, or trim-ethylolpropane tri(meth)acrylate), or (meth)acrylate esters formed by alcohols bearing other functional groups (such as tetrahydrofurfuryl (meth)acrylate or benzyl (meth)acrylate). Component (A) may also comprise a combination of two or more such monomers.

Preferred (meth)acrylate monomers are esters of $C_1$-$C_4$ monofunctional alcohols with (meth)acrylic acid, and methacrylate esters are particularly preferred. Methyl methacrylate is especially preferred. Most preferably component (A) comprises at least 50 wt % of esters of $C_1$-$C_4$ monofunctional alcohols, especially at least 50 wt % of methylmethacrylate, most preferably at least 70 wt % methylmethacrylate.

Preferred adhesive compositions may contain from 20 to 70 wt %, preferably 30 to 65 wt % and more preferably 35 to 65 wt % of (meth)acrylate ester monomer(s) as component (A), based on the total weight of the components (A) to (D).

Chlorinated Elastomeric Polymer

A chlorinated elastomeric polymer for component (B) may be any chlorine-bearing polymer, such as a thermoplastic polymer, elastomer or synthetic rubber that is at least partially soluble or dispersible in the (meth)acrylate monomer. Examples are polychloroprene (sometimes referred to as chlorinated polybutadiene), chlorinated polyethylene, chlorosulphonated polyethylene, other chlorinated hydrocarbon polymers, chlorinated rubber, and epichlorohydrin polymers, including copolymers of all of the above. Component (B) may comprise a combination of two or more of the above.

Preferred chlorinated elastomers are chlorinated polyethylenes (such as the Tyrin® range of DuPont Dow Elastomers S.A.) and polychloroprenes (such as the Neoprene™ products of DuPont Performance Elastomers LLC). The polychloroprenes are especially preferred. The "A" and "W" ranges of Neoprene products are particularly useful.

In this regard, various Neoprene products are available. Whilst the basic chemical composition of Neoprene synthetic rubber is polychloroprene, the polymer structure can be modified, for example by copolymerisation of chloroprene with sulphur and/or 2,3-dichloro 1,3-butadiene to yield a family of materials with a range of chemical and physical properties.

Preferred adhesive compositions may contain from 1 to 35 wt %, preferably 1 to 32 wt %, conveniently 3 to 32 wt % more preferably 3 to 28 wt % chlorinated elastomeric polymer(s) as component (B) based on the total weight of (A) to (D). It is particularly preferred for the composition to contain at least 5 wt % of component (B).

Core-Shell Impact Modifier

A core-shell impact modifier for component (C) may be any one of those familiar to those skilled in the art. These materials are particulate graft copolymers having a rubbery or elastomeric core and a hard shell. They swell in the (meth) acrylate monomer but do not dissolve therein. Typically, so-called "hard" monomers (such as styrene, acrylonitrile or methyl methacrylate) are grafted onto a rubbery core made from polymers of so-called "soft" monomers (such as butadiene or ethyl acrylate). The core-shell polymers are often referred to by abbreviations of the monomers they contain, useful types being the MABS (methacrylate-acrylonitrile-butadiene-styrene), ABS (acrylonitrile-butadiene-styrene) and MBS (methacrylate-butadiene-styrene) types.

Preferably, the core-shell impact modifier comprises a shell derived from a methacrylate polymer or copolymer. The MBS type of core-shell impact modifier is preferred, with the Paraloid™ BTA range of Rohm and Haas Company being especially preferred. A combination of two or more impact modifiers may be employed as component (C).

Example adhesive compositions may typically contain from 1 to 35 wt %, especially 3 to 35 wt % preferably 5 to 32 wt %, more preferably less than 30 wt %, especially 10 to 25 wt % or 10 to 20 wt % of core-shell impact modifier(s) as component (C), based on the total weight of (A) to (D).

Particularly preferred adhesive compositions may comprise up to 45 wt %, optionally up to 40 wt % of components (B) and (C) combined, based on the total weight of (A) to (D). Most preferred compositions may contain a combined amount of (B) and (C) in the range of 30 to 45 wt % and optionally in the range of 30 to 40 wt % of (A) to (D).

Example adhesive compositions may also contain components (B) and (C) is ratios ranging from 10:1 to 1:10, preferably 7:1 to 1:7, and most preferably in the range of 6:1 to 1:6.

In particularly preferred compositions components (B) and (C) are included in a ratio which is within the range of 2:1 to 1:2.

Urethane (Meth)Acrylate Oligomer

A urethane (meth)acrylate oligomer included as component (D) may be any of the type familiar to those skilled in either the coatings or the adhesives industries.

In general, urethane (meth)acrylate oligomers are usually the reaction products of an isocyanate component containing at least two isocyanate functional groups with a (meth)acrylate component containing at least one (meth)acrylate functional group and at least one group (such as hydroxyl or amino) reactive with the isocyanate functional group. Thus, for example, a simple type of urethane methacrylate oligomer could be prepared by reacting two moles of hydroxyethyl methacrylate with one mole of toluene 2,4-diisocyanate.

The isocyanate component may also be a prepolymer, formed by the reaction of a stoichiometric excess of an isocyanate containing at least two isocyanate functional groups with a chain-extending compound containing two or more functional groups (such as hydroxyl or amino) reactive with the isocyanate functional groups. One example of a chain-extending group is a polyether diol such as polyethylene glycol. Another example is amine terminated polyethers.

Thus, for example, a type of prepolymer isocyanate component could be prepared by reacting two moles of toluene 2,4-diisocyanate with one mole of a polyethylene glycol (these are commercially available in a variety of molecular weights). The resulting prepolymer could then be reacted with two moles of hydroxyethyl methacrylate to give the urethane methacrylate oligomer, which would have a theoretical structure A-X—Y—X-A, in which A is the acrylate component, X is the diisocyanate and Y is the polyethylene glycol chain-extender.

Urethane (meth)acrylates useful in the adhesive compositions of the invention may be of the simple (A-X-A) type or the chain-extended (A-X—Y—X-A) type. Those of the chain-extended type are preferred.

A greater or lesser degree of chain extension can be achieved by controlling the relative amounts of isocyanate (X) and polyol chain-extender (Y) to provide a theoretical structure A-(X—Y)$_n$—X-A where n is usually in the range of 1 to 5. Preferred urethane (meth)acrylate oligomers have a theoretical structure in which n=1. (As is well understood by those skilled in the art, the preparation of products of this nature inevitably results in a mixture of molecular structures with differing molecular weights, having a variety of values of n. The relative proportion of isocyanate (X) and polyol chain-extender (Y) determines the average value of n for what is in practice, a mixture of similar oligomer structures. Hence "preferred urethane (meth)acrylate oligomers have a theoretical structure in which n=1" refers to such a mixed product in which the average value of n is 1.)

In addition, as is well understood in the field of urethane (meth)acrylates an oligomer is a molecule having a relatively large molecular weight obtained by reaction of molecules having lower molecular weights; the oligomer may in some instances contain a small number of repeating sequences of the lower molecular weight molecules. Example urethane (meth)acrylate oligomers typically have a weight average molecular weight Mw below about 25,000 and particularly below about 20,000 and a number average molecular weight Mn below about 10,000 and especially below about 7,500.

Chain-Extending Reagents

Suitable chain-extending polyols are simple diols/polyols (such as ethylene glycol, diethylene glycol, triethylene glycol, tetraethylene glycol, propylene glycol, dipropylene glycol, tripropylene glycol, 1,3 or 1,4-butanediol, neopentyl glycol, 1,6-hexanediol, trimethylolpropane, pentaerythritol and the like) polyether polyols (homopolymers of ethylene oxide or propylene oxide or copolymers of the two, bearing two or more terminal hydroxyl groups, or simple diols/polyols extended by alkoxylation, especially ethoxylation/propoxylation), polyester polyols, polycaprolactone polyols, simple diols/polyols extended by reaction with lactones such as γ-butyrolactone, δ-valerolactone or ε-caprolactone, polytetramethylene glycols or polytetrahydrofurans.

Preferred chain-extending reagents have three or more hydroxyl groups available for reaction with an isocyanate group.

Particularly preferred chain-extending polyols are polyether polyols and polyester polyols.

Polyether Polyols

Especially preferred polyether polyols are alkoxylated (typically ethoxylated and/or propoxylated) derivatives of tri- or higher functional polyols.

Examples of suitable triols include trimethylolethane, trimethylolpropane and glycerol. Examples of tetra-functional polyols include pentaerythritol and ditrimethylolpropane. Hexa-functional polyols include dipentaerythritol and sorbitol.

Preferred polyether polyols are derived from tri- or tetra-functional polyols.

Such chain-extending reagents include ethoxylated and/or propoxylated derivatives of glycerol, ethoxylated and/or propoxylated derivatives of trimethylol propane and, more preferably ethoxylated and/or propoxylated derivatives of pentaerythritol. Such derivatives may contain from about 3 to 60 units of ethylene oxide (EO), propylene oxide (PO) or combinations thereof, for example.

Example polyether polyols suitable for use in the present invention include the alkoxylated range of polyols available from Perstorp Specialty Chemicals, Sweden. This range includes alkoxylated polyols having functionalities of 2, 3, 4 and 6 with OH values of 150 to 1000 mg KOH/g, and molecular weights ranging from about 150 to 1100 g/mol.

Additional examples of polyetherpolyols are available in the Voranol® range from The Dow Chemical Company. This range includes polyols having OH values of about 25 to 820, and molecular weights ranging from about 255 to 6000 g/mol.

Further example polyether polyols are also available in the Arcol® range of Bayer Material Science.

Particularly preferred polyether polyols which are alkoxylated derivatives of tri- or higher functional polyols include aliphatic hydrophilic triols and tetrols in the Simulsol® range from Seppic SA of Paris, France.

The range of hydrophilic triols includes ethoxylated derivatives of trimethylolpropane; the range of tetrols includes ethoxylated and propoxylated derivatives of pentaerythritol.

A particularly suitable example polyether polyol may have a molecular weight in the range 250 to 1100 g/mol.

Furthermore, preferred polyether polyols may have OH values in the range 1000 to 230 mgKOH/g.

Some commercially available products may also be a blend of polyether polyols and, in those cases, the number of (EO)/(PO) units might not be an integer.

Preferred polyetherpolyols for use in the present invention contain from 3 to 30 units of ethylene oxide, propylene oxide, or combinations thereof, more preferably from 3 to 20 such units and especially from 3 to 10 units.

Especially preferred polyether polyols are tri and tetrafunctional polyols which contain a theoretical average of up to 6 (EO)/(PO) units per arm of the polyol, and more preferably up to 3, suitably 0.5 to 3 (EO)/(PO) units per arm. Such units need not be distributed equally to all arms of the polyol.

Particularly preferred polyether polyols have average molecular weights of less than or equal to 1100 g/mol, especially less than or equal to 1000 g/mol more preferably less than or equal to 800 g/mol, and particularly preferably from 150 to 800 g/mol.

The following polyether polyols are especially preferred:
3-mole ethoxylate of pentaerythritol
5-mole ethoxylate of pentaerythritol
10-mole ethoxylate of pentaerythritol
20-mole ethoxylate of pentaerythritol
5-mole propoxylate of pentaerythritol
3-mole ethoxylate of trimethylolpropane.

In this regard, urethane (meth)acrylate oligomers derived from (i) a diisocyanate having two isocyanate groups which differ in reactivity; (ii) a chain-extending reagent which is a polyether polyol selected from ethoxylated and propoxylated derivatives of tri- and tetrafunctional polyols; and (iii) a hydroxy (meth)acrylate selected from polyethylene glycol (meth)acrylate and polypropylene glycol (meth)acrylate provide a third aspect of the present invention. Preferred embodiments of the chain-extending polyol, as described herein in relation to the adhesive composition, apply also to the third aspect of the invention.

Polyester Polyols

Example polyester polyols may be obtainable by condensation polymerisation of a polyol with a polycarboxylic acid. However, preferred polyester polyols are obtainable by reaction of a di- or higher functional polyol with a hydroxy-acid or a lactone.

Such preferred polyester polyols are obtainable by polymerisation of a lactone having a 4- to 10-membered ring, more preferably a 5-, 6- or 7-membered ring.

Examples include γ-butyrolactone, δ-valerolactone and ε-caprolactone, with ε-caprolactone especially preferred.

Generally lactone polymerisation is performed in the presence of an alcohol to facilitate the polymerisation. This may be a simple monofunctional alcohol, or a diol, or a tri- or higher functional alcohol. Example polyhydric alcohol compounds include sugar alcohols, especially those containing 5 to 6 carbon atoms, such as arabitol, xylitol, ribitol, mannitol, sorbitol, dulcitol and iditol.

Particularly preferred polyester polyols are derived from ε-caprolactone and a tri- or higher functional alcohol. Especially preferred polyester polyols are derived from ε-caprolactone and a sugar alcohol. Most preferably a polyester polyol is derived from ε-caprolactone and a hexitol, and especially sorbitol.

Polycaprolactone polyols suitable for use as chain-extending reagents in the present invention are also available from Perstorp Speciality Chemicals, in the CAPA® range. Diols, triols and tetrols are available. The triols are typically derived from trimethylolpropane and the tetrols from pentaerythritol. Preferred polycaprolactone polyols may have a molecular weight of 2000 g/mol, or less.

Particularly preferred polycaprolactone polyols may contain from 3 to 20 caprolactone units in the molecule, preferably from 3 to 10 caprolactone units.

Also preferred polycaprolactone polyols may contain a theoretical average of up to 6 caprolactone units per arm of the polyol, more preferably from 1 to 3 caprolactone units per arm. Such units need not be distributed equally to all arms of the polyol.

Preferred chain-extender polyols, as described above in the categories of both polyether polyols and polyester polyols, are simple diols/polyols extended by ethoxylation/propoxylation or by reaction with ε-caprolactone. Especially preferred as chain-extending polyols are the reaction products of sorbitol with ε-caprolactone and polyethoxylated or polypropoxylated derivatives of pentaerythritol.

Example chain-extending reagents which include two or more terminal amino groups include amine terminated polyethers, based on the polyethers as described above.

Example polyether amines are available from Huntsman Advanced Materials (Switzerland), in the Jeffamine® range. This range includes diamines having backbones based on polyethylene glycol, polypropylene glycol, and mixtures thereof. Triamines are also available, prepared by reaction of propylene oxide with a triol, followed by amination of terminal hydroxy groups. Products of various molecular weights are available in each category. Preferred polyetheramines would have a molecular weight of 1000 g/mol, or less.

Isocyanate

Suitable di/poly-isocyanates include aliphatic alkylene diisocyanates {such as 1,6-hexamethylene diisocyanate (HDI), 1,4-tetramethylene diisocyanate and 1,12-dodecane diisocyanate, for example}, cyclo aliphatic diisocyanates {such as 1,3- and 1,4-cyclohexane diisocyanates and isophorone diisocyanate (IPDI) and including hydrogenated aromatic diisocyanates such as hydrogenated diphenylmethane diisocyanate (hMDI) hydrogenated toluene diisocyanate (hTDI), hydrogenated tetramethylxylylene diisocyanate (hTMXDI) and hydrogenated polymethylene polyphenyl diisocyanate (hPAPI), for example}, araliphatic diisocyanates {such as tetramethylenexylylene diisocyanate (TMXDI)} and aromatic diisocyanates {such as 2,4- and 2,6-toluene diisocyanate (TDI) and 2,2'-, 2,4'- and 4,4'-diphenylmethane diisocyanates, for example}. Also, modified versions of such diisocyanates may be available, including dimers, trimers (IPDI trimer and HDI trimer are commercially available, for instance), uretidone-modified, urea modified, urethane modified and allophanate-modified diisocyanates. Preferably the isocyanate is a monomeric diisocyanate having a functionality of about 2.

Preferred isocyanates are diisocyanates in which the two isocyanate functional groups are non-equivalent, i.e. the two isocyanate groups do not have equal reactivity. This may be observed in cases where the molecular structure of the diisocyanate is not symmetrical.

Cycloaliphatic, araliphatic and aromatic diisocyanates in which the two isocyanate functional groups differ in their reactivity are further preferred.

Especially preferred are isophorone diisocyanate and toluene 2,4-diisocyanate, with isophorone diisocyanate (IPDI) being the most preferred.

(Meth)Acrylate Component

A (meth)acrylate component employed in the preparation of the urethane (meth)acrylate oligomer contains at least one (meth)acrylate functional group and at least one group (such as hydroxyl or amino) which is reactive with an isocyanate group.

A (meth)acrylate component may be any of those familiar from the numerous published syntheses of urethane (meth) acrylate oligomers. Particularly suitable (meth)acrylate components have a hydroxyl group and examples include 2-hydroxyethyl acrylate (HEA), hydroxypropyl acrylate (HPA), 2-hydroxyethyl methacrylate (HEMA), hydroxypropyl methacrylate (HPMA); ethoxylated and/or propoxylated derivatives of HEA, HEMA, HPA or HPMA, and reaction products of HEA, HEMA, HPA and HPMA with lactones, for example such as γ-butyrolactone or ε-caprolactone.

Hydroxy-functional species containing more than one (meth)acrylate functional groups, such as glycerol dimethacrylate and pentaerythritol triacrylate, may also be used. Preferred (meth)acrylate components are HEA, HEMA, HPA, HPMA and the polyethoxylated and/or polypropoxylated derivatives thereof.

Particularly preferred (meth)acrylate components include
polyethylene glycol monoacrylates,
polyethylene glycol monomethacrylates,
polypropylene glycol monoacrylates, and
polypropylene glycol monomethacrylates, each of which may contain from 3 to 9 or 10 repeating units of ethylene oxide (EO), propylene oxide (PO) or combinations thereof. Preferred components contain 5 to 10, especially 5 or 6 repeating (EO) or (PO) units.

Polyethylene glycol monomethacrylates and polypropylene glycol monomethacrylates are particularly preferred.

Preferred example polyethylene glycol (meth)acrylates have a molecular weight between 200 and 750, and especially between 200 and 550. Preferred example polypropylene glycol methacrylates have a molecular weight between 240 and 960, and especially between 240 and 700.

Examples of suitable components are available from the Bisomer™ range from Cognis Performance Chemicals UK Ltd, and the Bimax™ range from Bimax Chemical Ltd. Examples from Bimax include HEMA-5, which is polyethoxy (5) methacrylate having a molecular weight of 306 and OH value of 190; and HEMA-10, which is a polyethoxy (10) methacrylate having a molecular weight of 526 and OH value of 98 mg KOH/g.

Particularly preferred are polyethylene glycol monomethacrylate which contains 5 to 10 and especially 5 or 6 repeating (EO) units and polypropylene glycol monomethacrylate which contains 5 to 10 and especially 5 repeating (PO) units (which also corresponds to a tetrapropoxylated derivative of hydroxypropyl methacrylate).

In this regard, urethane (meth)acrylate oligomers derived from (i) a diisocyanate having two isocyanate groups which differ in reactivity; (ii) a chain-extending reagent which is a polyether polyol selected from ethoxylated and propoxylated derivatives of tri- and tetrafunctional polyols; and (iii) a hydroxy (meth)acrylate selected from polyethylene glycol (meth)acrylate and polypropylene glycol (meth)acrylate provide a third aspect of the present invention.

Preferred embodiments of
polyethylene glycol monoacrylates,
polyethylene glycol monomethacrylates,
polypropylene glycol monoacrylates and
polypropylene glycol monomethacrylates described in this section, in relation to the adhesive composition, apply also to the third aspect of the present invention.

Such polyethylene glycol (meth)acrylates and polypropylene glycol (meth)acrylates may be employed in combination with a chain-extending reagent which is a polyether polyol selected from ethoxylated and propoxylated derivatives of tri- and tetra-functional polyols as described above in relation to embodiments of the adhesive composition.

According to some embodiments a preferred (meth)acrylate component is HEA; according to other embodiments a preferred component is a tetrapropoxylated derivative of HPMA.

In a first group of embodiments of the invention a urethane (meth)acrylate oligomer for the adhesive composition is derived from:
(i) isophorone diisocyanate;
(ii) a polyester polyol obtainable by polymerisation of a lactone, especially ε-caprolactone; and
(iii) hydroxyethyl acrylate.

In a particularly preferred first group of embodiments a urethane (meth)acrylate for the adhesive composition is derived from:
(i) isophorone diisocyanate;
(ii) a polyester polyol derived from ε-caprolactone and a tri- or higher functional alcohol, especially a sugar alcohol; and
(iii) hydroxyethyl acrylate.

In a second group of embodiments a urethane (meth)acrylate oligomer is derived from
(i) a diisocyanate selected from isophorone diisocyanate and 2,4-toluene diisocyanate;
(ii) a polyol selected from ethoxylated and propoxylated derivatives of trimethylol propane and ethoxylated and propoxylated derivatives of pentaerythritol; and
(iii) a polyethylene glycol monomethacrylate or a polypropylene glycol monomethacrylate.

In a particularly preferred second group of embodiments a urethane (meth)acrylate oligomer is derived from
(i) a diisocyanate selected from isophorone diisocyanate and 2,4-toluene diisocyanate;
(ii) a polyol selected from ethoxylated and propoxylated derivatives of trimethylol propane and ethoxylated and propoxylated derivatives of pentaerythritol, wherein the number of units of ethylene oxide, propylene oxide or combinations thereof is in the range of 3 to 20; and
(iii) a polyethylene glycol monomethacrylate or a polypropylene glycol monomethacrylate, each of which contains from 5 to 10 repeating units of ethylene oxide or propylene oxide.

Such urethane (meth)acrylate oligomers of this second group of embodiments provide a third aspect of the present invention, as discussed above.

In a further group of embodiments a blend of the urethane (meth)acrylate oligomers of the first and second group of embodiments can be employed.

Example blends of urethane (meth)acrylate oligomers for use as component (D) may include the respective oligomers in a ratio of 10:1 to 1:10, especially 5:1 to 1:5, more preferably 3:1 to 1:3.

Preferred blends of urethane (meth)acrylate oligomers for use of component (D) may comprise a) at least one first oligomer derived from a polyester polyol chain-extending reagent and b) at least one second oligomer derived from a polyether polyol chain-extending reagent, in a ratio (a):(b) of 10:1 to 1:10, especially 5:1 to 1:5, more preferably 3:1 to 1:3.

In most preferred embodiments such urethane (meth)acrylate oligomers (a) correspond to the first group of embodiments as described above and urethane (meth)acrylate oligomers (b) correspond to the second group of embodiments described above.

In some embodiments it is especially preferred that urethane oligomers (a) provide at least 50 wt % of the oligomer blend.

In this respect, a blend of urethane (meth)acrylate oligomers (a) and (b) may preferably be employed in a two part system of the following type which comprises:
(i) a first part containing an adhesive composition which comprises components (A), (B), (C) and (D); and
(ii) a second part containing at least one component capable of initiating and/or promoting free radical polymerisation of components in the first part.

Thus in a particularly preferred embodiment of the invention, the urethane (meth)acrylate (D) is a reaction product of sorbitol, ε-caprolactone, IPDI and HEA.

In another preferred embodiment of the invention, the urethane (meth)acrylate (D) is reaction product of a polyethoxylated pentaerythritol, IPDI and the tetrapropoxylate of hydroxypropyl methacrylate. In a further, and most preferred, embodiment of the invention, the urethane (meth)acrylate component (D) is a mixture of the first and second types of urethane (meth)acrylate.

Preferably the (i) isocyanate, (ii) chain-extending reagent and (iii) hydroxy (meth)acrylate undergo reaction until the isocyanate (NCO) content of the urethane (meth)acrylate oligomer is 1% or less, preferably 0.8% or less, more preferably 0.6% or less.

A urethane (meth)acrylate oligomer which is the reaction product of (i), (ii) and (iii) above typically takes the form of a solution of oligomer in monomer(s) otherwise known as a resin. Some of the monomer content of the resin may be provided by an excess of reagents (ii) and/or (iii).

Generally, in both cases the reaction between the isocyanate and the chain-extending reagent, and the reaction between the isocyanate and end-capping hydroxyl(meth)acrylate require a catalyst. A preferred catalyst is a metal salt, especially a metal carboxylate. Tin catalysts are preferred. Particularly preferred catalysts are tin carboxylates, especially organotincarboxylates. A preferred example is dibutyltin dilaurate.

Reaction between isocyanate component (i) and chain-extending reagent (ii), and the isocyanate component (i) and hydroxyl(meth)acrylate (iii) will generally be performed at temperatures in the range of 40 to 130° C., and especially, in many cases, at a temperature in the range of 50 to 110° C.

The composition and characteristics of the resin may be further modified by the addition of diluent monomer(s). This may be done for the purpose of adjusting the viscosity/solids content of the resin, for example, or for influencing the subsequent curing characteristics of the resin.

Suitably, a diluent monomer has one ethylenically unsaturated bond.

Example diluent monomers include vinyl aromatics, such as styrene, methylstyrene, ethylstyrene, halogenated styrene and vinyl toluene. Additional diluent monomers include (meth)acrylate ester monomers, such as those exemplified for component (A) above.

Such monomers can be added prior to or during formation of the urethane (meth)acrylate oligomer. Additionally or alternatively diluent monomer may be added to the urethane (meth)acrylate reaction product. Diluent monomer content in such a resin may be up to 55 wt % of the resin, for example.

As indicated in the Examples, isocyanate (i) may firstly undergo reaction with end-capping hydroxy (meth)acrylate (iii), followed by reaction with a chain-extending reagent (ii). Alternatively, reaction between isocyanate (i) and chain-extending reagent (ii) may take place before reaction with hydroxy (meth)acrylate (iii).

With regard to the new urethane (meth)acrylate oligomers in accordance with the third aspect of the invention it is preferable to react the isocyanate (i) and end-capping hydroxy (meth)acrylate followed by reaction with a chain-extending reagent (ii).

Example adhesive compositions may typically contain up to 40 wt %, preferably 1 to 30%, more preferably 1 to 25%, still more preferably 2 to 20% of urethane (meth)acrylate oligomer(s) as component (D) based on the total weight of (A) to (D).

Example adhesive compositions may comprise, based on the total weight of components (A), (B), (C) and (D), the following:
- (A) from 20 to 70% by weight, preferably 30 to 65%, more preferably 35 to 62% or 35 to 60% (meth)acrylate ester monomer;
- (B) from 1 to 35% by weight, preferably 1 to 30%, especially 3 to 28% more preferably 3 to 25% and especially 5 to 32% chlorinated elastomeric polymer;
- (C) from 1 to 35% by weight, especially 3 to 35%, preferably 3 to 32%, more preferably 5 to 25% or 5 to 20%, especially 10 to 25% or 10 to 20% core-shell impact modifier; and
- (D) from 1 to 40% by weight, preferably 1 to 30%, more preferably 1 to 25%, especially 2 to 20% urethane (meth)acrylate oligomer.

Further Components of the Adhesive Compositions

Optionally, the Adhesive Composition of the Invention May contain one or more acid-functional ethylenically unsaturated monomers to assist bonding to metal surfaces, as is known in the art. Examples of such acid-functional monomers include ethylenically unsaturated $C_3$ to $C_6$ monobasic or dibasic carboxylic acids, such as acrylic acid, methacrylic acid, maleic acid, fumaric acid, itaconic acid and crotonic acid. Further examples include ethylenically unsaturated acids having an aromatic group substituent, such as cinnamic acid.

Methacrylic acid and maleic acid are preferred, with methacrylic acid being especially preferred.

Preferably the adhesive compositions contain less than 15 wt % acid-functional ethylenically unsaturated monomer, more especially less than 10 wt %, particularly from 1 to 10 wt %, often from 1 to 5 wt %, based on the total weight of the composition. In this respect the total weight of the composition includes the first and second parts of a two part system and preferably includes initiator(s) and promoter(s) which provide the "cure system".

Bonding to metal surfaces may be further assisted by the inclusion of one or more unsaturated phosphate-containing monomers, as is also known in the art. Examples are ethylene glycol methacrylate phosphate (sometimes termed phosphoethyl methacrylate) and various proprietary unsaturated phosphates such as Sipomer® PAM-100 and PAM-200 (offered by Rhodia), Light Ester P-1M and P-2M (offered by Kyoeisha Chemical Co., Japan) or Sartomer CD9053 (a trifunctional acid ester offered by Sartomer Co. Inc.). Preferred phosphate-containing monomers are ethylene glycol methacrylate phosphate and Sartomer CD9053, with Sartomer CD9053 being most preferred.

Such phosphate-containing monomers may be present in an amount of 0.1 to 5.0%, preferably 0.2 to 5.0% often 0.25 to 2.5%, especially 0.5 to 1.5%, based on the total weight of the adhesive composition.

The adhesive may also contain inhibitors and stabilisers, which help to prolong the shelf life of the product in storage and to control the working time of the adhesive in use. Such inhibitors are well known to those skilled in the art and may comprise quinones, hydroquinones, substituted phenols and the like. In addition to inhibitors that may be added directly to the adhesive composition during its preparation, some of the raw materials employed, especially the (meth)acrylate ester monomer(s), may also contain inhibitors introduced by the manufacturer/supplier. Hence, on account of the variety of materials that may be chosen, some with in situ inhibitors, and the variety of initiators, promoters and inhibitors that may be used to prepare a composition, the selection of the complete inhibitor package is generally the final step in the formulating process. The selection is specific to each formulation and generally proprietary to those skilled in the art.

The adhesive may also contain a small amount of chelating agent such as the tetrasodium salt of ethylene diamine tetraacetic acid. Chelating agents are used as scavengers for trace metal impurities that can destabilise the reactive (meth) acrylate formulations, so they may be included to impart further stabilisation to the adhesive compositions.

Chelating agent may be present in an amount of 0.01 to 0.5%, preferably 0.01 to 0.2% often 0.025 to 0.2%, suitably 0.04 to 0.14%, based on the total weight of the adhesive composition.

The adhesive may also contain a small amount of wax to increase the so-called "open time" of the adhesive in use, i.e. the length of time over which a layer of the adhesive remains skin-free. A variety of waxes, both natural and synthetic, are suitable but paraffin waxes are preferred, with the IG1977 wax available from International Group being especially preferred. Typically the amount of wax would be less than 0.8 wt %, especially up to 0.5 wt % based on the total weight of the adhesive composition.

The adhesive may also contain small amounts of viscosity control agents such as organoclays or fumed silica, or larger amounts of fillers and/or extenders such as talc, clay, calcium carbonate or alumina hydrate, to reduce the cost of the adhesive.

Each of the above categories of additives, namely phosphate containing monomer(s), inhibitors/stabiliser(s), chelating agent(s), wax; viscosity control agent(s) and extender(s) may preferably be included in an individual amount of up to 1 wt % of the adhesive composition, more preferably up to 0.8 wt %. It is particularly preferred that the total amount of such additives (other than the initiator/promoter of the curing system) is from 1 to 5 wt % of the total adhesive composition, more preferably from 2 to 3 wt %.

The adhesives of the invention are typically cured by means of a peroxide or hydroperoxide initiator in combination with an amine promoter, although in some cases additional components are also used to facilitate cure. Typical peroxides are benzoyl peroxide, cumene hydroperoxide, tert-butyl hydroperoxide, dicumyl peroxide, tert-butyl peroxyacetate and tert-butyl perbenzoate. The most common amine promoters are well known to those skilled in the art and include tertiary aromatic amines and aldehyde-amine reaction products. Useful tertiary amines include N,N-dimethylaniline, N,N-diethylaniline, N,N-dimethyl-p-toluidine, N,N-diethyltoluidine and N,N-bis(2-hydroxyethyl)-p-toluidine. Aldehyde-amine reaction products include such compositions as butyraldehyde-aniline and butyraldehyde-butylamine derivatives whose active ingredient is a dihydropyridine (DHP) formed from condensation of three moles of aldehyde with one mole of amine. DHP-enriched versions of these compositions are commercially available, one such being Reillcat ASY-2, available from Reilly Industries Inc. DHP promoters are most commonly used with hydroperoxide initiators, such as cumene hydroperoxide or tert-butyl hydroperoxide, especially in conjunction with a chlorosulphonated species such as p-toluenesulphonyl chloride or a chlorosulphonated polymer, for instance chlorosulphonated polyethylene.

Transition metal salts, including organometallic compounds (such as cobalt, nickel, manganese or iron naphthenates or octoates, copper octoate, copper acetylacetonate, iron hexoate or iron propionate) may also be included as promoters for the adhesive compositions of the invention. These can be added in amounts up to about 2% weight, but are preferably used in amounts from 1 part per million to 0.5% weight, most preferably from 5 parts per million to 0.5% weight. Metallic promoters may be used with certain peroxides as the primary promoter for the peroxide, or in combination with either tertiary amine or amine-aldehyde promoters to enhance the rate of polymerisation.

Preferred combinations of initiator and promoter for the curing system are those suitable for curing at ambient temperatures.

The adhesives of the invention are, as is usual with (meth) acrylate-based adhesives, two-pack systems consisting of two separate parts that are mixed just prior to use to initiate cure. The first part (or 'A-side') lacks at least one of the components of the cure system, which is instead included in the second part (or 'B-side'). A-side and B-side are therefore stable on prolonged storage, as neither side contains all of the components necessary for polymerisation (cure) to occur. Just before use, the A-side and B-side are mixed together in whatever ratio is appropriate for the cure system being employed.

In one preferred embodiment of the invention, the B-side consists only of the peroxide initiator (usually benzoyl peroxide) in some sort of liquid carrier medium (usually an ester-based plasticiser), while the A-side contains all the other components of the adhesive, the A-side being mixed with the B-side in any ratio from about 100:1 (A-side:B-side) to about 5:1, preferably from 50:1 to 10:1. In this embodiment, the amine promoter, contained in the A-side, is typically an aromatic tertiary amine, with N,N-dimethyl-p-toluidine and N,N-bis(2-hydroxyethyl)-p-toluidine being preferred. Such a cure system is sometimes referred to by those skilled in the art as a "10:1 cure system" on account of the preferred mix ratio of A-side to B-side used with this particular cure system.

In another preferred embodiment of the invention, the mix ratio of A-side to B-side lies in a range from about 2:1 to about 1:2, the preferred mix ratio being 1:1. In this embodiment, the adhesive base (i.e. the adhesive formulation minus all of the components of the cure system) may be viewed as being divided into two equal halves. One half, the A-side, has the initiator incorporated into it, while the other half, the B-side, has the promoter incorporated into it. The preferred form of these 1:1 mix ratio products employs cumene hydroperoxide in conjunction with p-toluenesulphonyl chloride as initiators in the A-side, while the B-side includes a DHP-type promoter, sometimes in conjunction with a small quantity of a transition metal complex (such as copper acetylacetonate). This cure system is therefore sometimes referred to as a "1:1 cure system" on account of the preferred mix ratio, in the same fashion as the 10:1 cure system above.

As shown in the experimental section below, blends of urethane (meth)acrylate oligomers are particularly suitable for use in a 10:1 cure system.

Preferred example adhesive compositions may comprise, based on the total weight of the composition, the following:
(A) from 20 to 70%, preferably 35 to 65% by wt (meth) acrylate ester monomer;
(B) from 1 to 30%, preferably 3 to 28%, especially 5 to 28% by wt chlorinated elastomeric polymer;
(C) from 1 to 30%, preferably 3 to 28%, especially 5 to 28% by wt core-shell impact modifier;
(D) from 1 to 40%, preferably 1 to 30% by wt more preferably 1 to 20% urethane(meth)acrylate oligomer; and up to 10% acid-functional ethylenically unsaturated monomer.

In particularly preferred adhesive compositions the combined weight of components (B) and (C) preferably corresponds to between 25 to 40 wt % of the total weight of the composition, more preferably between 28 to 40 wt %, often between 30 to 40 wt %.

Particularly preferred adhesive compositions for use in a 10:1 cure system contain between 10 and 20 wt % urethane (meth)acrylate oligomer (D), based on the total weight of the composition and preferred compositions for use in a 1:1 cure system contain between 1 and 10 wt % (D).

Whilst the invention is not particularly limited by the packaging holding the A and B sides of the adhesive composition, nor by the means by which the A and B sides are mixed prior to use, it is preferred that the A and B sides are packed in separate barrels of a two-barrel cartridge. The two barrels may be adjacent to one another or concentric, one mounted inside the other. In use, the cartridge is mounted in a "gun" equipped with one or more plungers, which drive the adhesive forwards from the rear of the barrels, both A and B sides thus being extruded together through a mixing nozzle mounted on the front of the assembly. The mixed adhesive can then be applied directly from the nozzle onto the substrates to be bonded.

Embodiments of the present invention will be described by way of example. Synthetic Example 1 concerns a resin UA-1 disclosed in an earlier application, EP-A-0056713. The other synthetic examples concern new resins and illustrate a third aspect of the invention.

Materials and Methods

Simulsol PTKE is a 5-mole ethoxylate of pentaerythritol available from Seppic SA of Paris, France (mwt=355, OH value=650 mgKOH/g).

Simulsol PTIE is a 3-mole ethoxylate of pentaerythritol available from Seppic SA of Paris, France (mwt=270, OH value=800 mgKOH/g).

Simulsol PTPE is a 10-mole ethoxylate of pentaerythritol available from Seppic SA of Paris, France (mwt=575, OH value=400 mgKOH/g).

Simulsol PTZE is a 20-mole ethoxylate of pentaerythritol available from Seppic SA of Paris, France (mwt=1015, OH value=230 mgKOH/g).

Simulsol PTKP is a 5-mole propoxylate of pentaerythritol available from Seppic SA of Paris, France (mwt=425, OH value=530 mgKOH/g).

Simulsol TOIE is a 3-mole ethoxylate of trimethylolpropane available from Seppic SA of Paris, France (mwt=270, OH value=630 mgKOH/g).

Bisomer PPM5 is a polypropylene glycol monomethacrylate, the reaction product of 5 moles of propylene oxide with 1 mole of methacrylic acid, available from Cognis Performance Chemicals UK Ltd.

Bisomer PEM6 is a polyethylene glycol monomethacrylate, the reaction product of 6 moles of ethylene oxide with 1 mole of methacrylic acid, available from Cognis Performance Chemicals UK Ltd.

The material referred to as "TMP Amine" in Synthetic Example 10 below is an amine-terminated propoxylated trimethylolpropane (average molecular weight 440, corresponding to ~5.275 moles of propylene oxide per mole of TMP). It was obtained from Sigma Aldrich laboratory supplies (Gillingham, Dorset, UK), catalogue number [39423-51-3]. Structurally, in terms of average number of propylene oxide units per arm, it is therefore close to Simulsol PTKP, but has the three terminal OH groups replaced by $NH_2$ groups.

Fascat 4202CL is a proprietary tin-based reaction catalyst available from Atofina.

Isophorone diisocyanate monomer can be obtained from Bayer as Desmodur I.

The toluene 2,4-diisocyanate used in synthetic example 11 was the 95% purity grade of tolylene 2,4-diisocyanate offered by Sigma Aldrich laboratory supplies (Gillingham, Dorset, UK).

Neoprene WM-1, and Neoprene WB are general purpose polychloroprenes available from DuPont Performance Elastomers.

Neoprene AD-20 is an adhesive grade of polychloroprene available from the same source.

Tyrin® 3615P is a chlorinated polyethylene polymer available from DuPont Dow Elastomers S.A.

Nipol 1072 is a carboxylic functional butadiene-acrylonitrile copolymer obtainable from Zeon Chemicals.

The orthophthalic polyester resin used in comparative example C22 is a reaction product of diethylene glycol, Pergaquick A150 (an ethoxylated amine obtainable from Pergan GmbH), phthalic anhydride and maleic anhydride at 5.3% equivalence glycol excess. The amount of Pergaquick employed was 1.4 mol % of the glycol portion of the resin and the phthalic:maleic molar ratio was 7:3. The polyester polymer was dissolved in styrene monomer to 35 wt % styrene content and pre-accelerated with 3.6 wt % of a proprietary aromatic amine accelerator.

Paraloid™ BTA 753 is a MBS-type impact modifier available from Rohm and Haas Company.

CD9053 is a trifunctional acid ester obtainable from Sartomer Company Inc.

Halox ZPLEX 111 is a complexed zinc phosphate anticorrosive pigment available from Halox, a division of Hammond Group Inc.

HET is N,N-bis(2-hydroxyethyl)-p-toluidine and was obtained from Sigma Aldrich Laboratory Supplies of Gillingham, Dorset, UK.

DMPT is N,N-dimethyl-p-toluidine, obtained from the same source.

Reillcat ASY-2 is a commercial grade of purified dihydropyridine (PDHP) accelerator, the active ingredient being 3,5-diethyl-1,2-dihydro-1-phenyl-2-propylpyridine.

EDTA solution is a solution of 7% of ethylenediamine tetraacetic acid tetrasodium salt (obtained from Sigma Aldrich, as above) in a 50:50 mixture of distilled water and diethylene glycol.

Benzoflex 9-88 is a benzoate ester plasticiser, predominantly dipropylene glycol benzoate, available from Eastman Chemical Company.

Ethanox 4703 is a hindered phenol antioxidant available from Albemarle Corporation.

HDK-N20 is a proprietary grade of hydrophilic fumed silica available from Wacker Chemie AG.

With the exception of adhesive examples 34 and 36 and comparative adhesive example C35, the adhesives were cured for testing with the 10:1 cure system, 2% by weight of Perkadox BM-50R benzoyl peroxide paste being mixed into the adhesive (i.e. 98 g of adhesive plus 2 g of BM-50R). To obtain more reliable results from the tensile tests, it is important to exclude as much air as possible from the mixed adhesive, so the BM-50R was incorporated into the adhesive by means of a Hauschild AM501 so-called "speed mixer", a dual axis centrifuge mixer, having previously dispensed the two components into a 100 ml plastic tub fitted with a screw-on lid. The mixer subjects the tub to a high speed double centrifugal action which both folds the initiator into the bulk of the adhesive and forces any air bubbles out. For the adhesive bonding tests, initiator and adhesive were simple mixed by hand.

To prepare specimens for the tensile tests, the initiated adhesive was poured into a 3 mm gap between two sheets of Melinex sheet (Melinex is a well-known brand of polyethylene terephthalate thin sheet) supported by glass plates approx. 30 cm square. The 3 mm gap is maintained by means of 3 mm thick PTFE spacers. The resulting cast sheets were left to cure overnight at ambient temperature before the test specimens were cut from them by means of a press and punch. The specimens are dumbbell shaped, the dimensions being as per the type 5 specimens of ISO Standard 527 part 3 (1995). The specimens were then post-cured for 3 hours at 80° C. in an oven before being tested according to the same ISO 527, in this case part 1 of the 1993 version. The test equipment was an Instron static tensile testing machine with a 50kN load cell and a non-contact extensometer. A 5 mm/minute displacement rate was used for the tensile tests.

Lap shear adhesion tests on aluminium used test pieces of 6061-T6 grade aluminium 25 mm wide and 1.62 mm thick. These were acetone-wiped before bonding. A small blob of initiated adhesive was applied to one end of both of the test pieces to be bonded and the two then laid, adhesive ends together, in a metal mould which positions the two in such a way as to give the correct overlap between them (12.5 mm) and bond line thickness (10 mil, i.e. 10 thousandths of an inch). Thus set up, the specimens were left to cure overnight at ambient temperature before being post-cured for 16 hours at 40° C. prior to testing. The adhesive joints were pulled apart, using the same Instron machine, according to ISO Standard 4587 (2003).

Lap shear tests on stainless steel were performed in the same fashion, using type 304 stainless to ASTM A240. Those on cold rolled steel (commercial quality to ASTM 1008) were very similar, the only difference being that the steel test pieces were abraded before bonding, using a linisher fitted with 200 grit glass paper.

To test the tensile lap shear strength of aluminium bonded joints after exposure to a corrosive environment, the adhesive joints were first prepared as described above. Then, after post-cure, they were placed in a salt spray cabinet according to DIN Standard 50 021, Method SS (1988) for a period of 7 days at the temperature, salt concentration and pH prescribed by the Standard. Adhesive strength was then determined with the Instron machine as described.

The lap shear adhesion tests on glass reinforced polyester (GRP) used test pieces of GRP laminate approx. 3 mm thick and 25 mm wide, fabricated by hand from an isophthalic unsaturated polyester resin and a 600UD/150 csm combination glass mat obtained from Chomarat. These test pieces were also acetone-wiped before bonding and set up to give an overlap length of 25 mm and a bond line thickness of 3 mm. (Instead of a metal mould, which would not be appropriate for a more variable material like GRP, these joints were set up using pieces cut from the same sheet of GRP to provide a template, along with a 3 mm spacer to set the bond line thickness. The test pieces were bonded with the two non-moulded sides together, so the bond should be free from mould release agent.) This overlap and spacing differ from those of the standard being followed, ASTM D5868 (1995), the reason being to more closely simulate customer field use conditions. As with the aluminium specimens, the joints were cured overnight at ambient temperature, followed by a post-cure of 16 hours at 40° C. They were pulled apart with the usual Instron machine, according to ASTM D5868 (1995). The grip separation used, however, differs from that in the standard, 115 mm being employed instead of 75 mm. It was felt that the shorter grip separation was twisting the specimens too much under load, inducing too much peel into the results.

Were the same test method for tensile lap shear strength to be used for thermoplastic substrates like acrylic sheet, the results would be distorted by deformation of the substrate itself. Consequently, a compressive lap shear strength test was used for these substrates, this being drawn from ASTM D2564 (2004), which is actually a test for solvent cements for PVC pipes. In this test, a square of the thermoplastic sheet 25 mm×25 mm×5 mm thick is bonded to the top of a rectangular piece from the same sheet, of dimensions 25 mm×50 mm. These are acetone-wiped before bonding and are set up with a bond line thickness of 30 mil. In this case, the bond line is set by mixing into the adhesive 1% by weight of 30 mil glass beads, a technique well known to those skilled in the art. The prepared joints are left to cure at ambient temperature for 72 hours before testing. The test uses the same Instron machine, but in compressive mode. The smaller one of the two bonded pieces of thermoplastic is clamped rigid while the test machine pushes downwards on the edge of the larger one. The standard uses a displacement speed of 1.25 mm/minute, but in the case of these adhesive tests, this slow speed was found to cause excessive deformation of the test pieces. A faster speed of 13 mm/minute was found to better test the adhesive itself. Although the standard relates to PVC, it was applied to acrylic for these tests, as acrylic is a material preferred by the likely users of this type of adhesive.

In all these tests, 5 specimens of each were tested and the results averaged. For the tensile tests, however, the maximum elongation at break is also quoted in the tables, this being the best result obtained from out of the five samples tested.

Some adhesives were also tested (see Table 4) for boiling curing cure, and for surface hardness, by mixing 500 g of adhesive with 10 g of Perkadox BM-50R benzoyl peroxide paste (50% active content), by hand, being careful not to introduce excessive air during mixing. The adhesive was then poured into a plastic dispensing cartridge, from which 400 g was dispensed in a so-called "bead" one inch high and six inches long. This was allowed to cure at ambient temperature, the cured mass then being allowed to cool overnight before being sawn in half crossways. Surface boil and centre boil were then rated visually, according to the volume of gas bubbles apparent. An arbitrary scale of 1 to 5 was used to rank the formulations, with a value of 1 representing minimal gassing or boiling and 5 representing excessive boiling and gaseous expansion of the mass, similar to foaming. Shore D hardness was also measured at both the surface and the centre, as per standard method ISO 868 (2003).

EXAMPLES

Synthetic Example 1

Urethane acrylate resin UA-1 was prepared by reaction of sorbitol, ε-caprolactone, isophorone diisocyanate (IPDI) and 2-hydroxyethyl acrylate. Its composition is disclosed on page 10 of European Patent No. 0056713A2.

1.0 moles of Sorbitol and 18.0 moles of e-Caprolactone were charged to a suitable reaction vessel and heated to 90-100° C. with stirring. A cloudy homogeneous dispersion was obtained to which was added 0.2% p-toluene sulphonic acid. An exothermic reaction began almost instantaneously and the temperature rose peaking at 140-150° C.

The batch was allowed to cool naturally for 15 minutes and was then vacuum stripped. Less than 2% of charge weight was removed.

After stripping, the temperature was adjusted to 100-110° C. and 3.5 moles of isophorone di-isocyanate was added. A gentle exotherm began and the batch temperature was allowed to rise to 120-130° C. where it was controlled by cooling.

When the exotherm was over, the batch was cooled to 90-95° C. and 3.5 moles of 2-hydroxy ethyl acrylate and 100 ppm hydroquinone were added. A below the surface feed of air was started and the temperature was adjusted to 80-85° C. The batch was maintained at this temperature until the isocyanate content was less than 0.6% (equivalent to 95% conversion). The batch was then dissolved in styrene to provide a composition containing approximately 60% solids by weight.

Synthetic Example 2

A continuously stirred stainless steel reactor was charged with 42.452 kg of isophorone diisocyanate (IPDI) and a solution of 28 g of Inhibitor T, 19 g of benzoquinone and 37 g of toluhydroquinone (sometimes called methylhydroquinone) in 460 g of methyl methacrylate. This mixture was warmed to 45° C. and a solution of 10 g Fascat 4202CL in 442 g methyl methacrylate added. Gradually, 66.542 kg of Bisomer PPM5 was fed into the reactor, the reaction exotherm taking the temperature up to 61.5° C. This feed took 90 minutes to complete. After a further 30 minutes at 61.5° C., the isocyanate content was found to be 6.8%. The temperature of the reactor was raised to 80.0° C. and a solution of 19 g of Fascat 4202CL in 433 g of methyl methacrylate was added. 17.033 kg of Simulsol PTKE was then fed gradually to the reactor over a period of 75 minutes, keeping the temperature in the reactor between 80° and 85° C. Any residual Simulsol PTKE remaining in the feed vessel was then rinsed into the reactor with a further 7.562 kg of methyl methacrylate. One hour later, the isocyanate content of the reactor contents was measured and found to be 0.16%. 45.010 kg of methyl methacrylate was stirred into the reactor contents to give the product, urethane acrylate resin UA-2, with a theoretical oligomer content of 70.8%, the balance being 29.2% methyl methacrylate. This was cooled back to normal ambient temperature before decanting. It had a viscosity of 7.0 Poise and a density of 1.0461 gcm$^{-3}$.

Synthetic Example 3

A continuously stirred glass reactor was charged with 191.614 g isophorone diisocyanate (IPDI) and a solution of 0.150 g Inhibitor T, 0.200 g toluhydroquinone and 0.100 g benzoquinone in 2.35 g methyl methacrylate. The mixture was warmed to 45°-50° C. and a solution of 0.100 g Fascat 4202CL in 2.400 g methyl methacrylate added. After this, 299.045 g of Bisomer PPM5 was fed slowly into the reactor over a period of 80 minutes, keeping the temperature in the reactor between 55° and 60° C. 40 minutes after the completion of this feed, the isocyanate content of the reaction mixture was found to be 7.29%, so the temperature was raised to 80° C. before addition of a further solution of 0.100 g Fascat 4202CL in 2.400 g methyl methacrylate. Then 209.331 g of Simulsol PTZE was fed gradually into the reactor over a period of 110 minutes, keeping the temperature in the reactor below 85° C. After completion of this feed, any residual Simulsol PTZE remaining in the feed vessel was rinsed into the reactor with a further 42.200 g of methyl methacrylate. The reactor was maintained at 80°-85° C. until the isocyanate content dropped to below 0.3% (approximately 1 hour), when 250.000 g of methyl methacrylate was stirred into the mixture to give the product, urethane acrylate resin UA-3, with a theoretical oligomer content of 70.8%. This was cooled back to normal ambient temperature before decanting.

Synthetic Examples 4 to 9

These were prepared according to the method of Synthetic Example 3, using the materials and quantities set out in Table 1 following. In all cases, the amounts of inhibitors, catalysts and methyl methacrylate reactive diluent were the same as those used in Synthetic Example 3. All weights are in grams, NCO contents are in % (weight) and feed times are in minutes.

TABLE 1

| EXAMPLE | 3 | 4 | 5 | 6 | 7 | 8 | 9 |
|---|---|---|---|---|---|---|---|
| RESIN | UA-3 | UA-4 | UA-5 | UA-6 | UA-7 | UA-8 | UA-9 |
| IPDI | 191.624 | 244.782 | 219.524 | 230.009 | 235.865 | 201.913 | 235.262 |
| Bisomer PPM5 | 299.045 | 382.001 | 342.585 | 360.485 | 369.665 | 316.452 | — |
| Bisomer PEM6 | — | — | — | — | — | — | 370.361 |
| Bisomer feed time | 80 m | 105 m | 105 m | 115 m | 100 m | 105 m | 125 m |
| 1$^{st}$ stage NCO content | 7.29% | 7.30% | 7.26% | 7.30% | 7.30% | 7.35% | 7.26% |
| Simulsol PTZE | 209.331 | — | — | — | — | — | — |
| Simulsol PTIE | — | 73.217 | — | — | — | — | — |
| Simulsol PTPE | — | — | 137.891 | — | — | — | — |
| Simulsol PTKP | — | — | — | 109.506 | — | — | — |
| Simulsol TOIE | — | — | — | — | 94.470 | — | — |
| PEG400* | — | — | — | — | — | 181.635 | — |
| Simulsol PTKE | — | — | — | — | — | — | 94.378 |
| Polyol feed time | 110 m | 160 m | 125 m | 110 m | 95 m | 120 m | 110 m |
| Final NCO content | 0.30% | 0.28% | 0.26% | 0.28% | 0.27% | 0.22% | 0.21% |

*=PEG400 is polyethylene glycol of average molecular weight approximately 400.

Synthetic Example 10

A continuously stirred glass reactor was charged with 241.620 g isophorone diisocyanate (IPDI) and a solution of 0.150 g inhibitor T, 0.200 g toluhydroquinone and 0.100 g benzoquinone in 2.35 g methyl methacrylate. The mixture was warmed to 45°-50° C. and a solution of 0.100 g Fascat 4202CL in 2.400 g methyl methacrylate added. After this, 378.683 g of Bisomer PPM5 was fed slowly into the reactor over a period of 105 minutes, keeping the temperature in the reactor between 55° and 60° C. 30 minutes after the completion of this feed, the isocyanate content of the reaction mixture was found to be 7.53%. Since the addition of an amine-functional, rather than OH functional, polyol to the isocyanate was expected to be more vigorously exothermic, the temperature was cooled to <20° C. before the next stage. 143.097 g of "TMP Amine" was fed gradually into the reactor over a period of 190 minutes, keeping the temperature in the reactor below 40° C. After completion of this feed, any residual "TMP Amine" remaining in the feed vessel was rinsed into the reactor with a further 42.200 g of methyl methacrylate. At this point, the isocyanate content of the reaction mixture was found to be 0.02%, so 250.000 g of methyl methacrylate was stirred into the mixture to give urethane acrylate resin UA-10, theoretical oligomer content 70.7% in methyl methacrylate reactive diluent monomer.

Synthetic Example 11

A continuously stirred glass reactor was charged with 199.302 g of toluene 2,4-diisocyanate (TDI) and a solution of 0.150 g inhibitor T, 0.200 g toluhydroquinone and 0.100 g benzoquinone in 2.35 g methyl methacrylate. The mixture was warmed to 30° C. and a solution of 0.100 g Fascat 4202CL in 2.400 g methyl methacrylate added. After this, 398.657 g of Bisomer PPM5 was fed slowly into the reactor over a period of 85 minutes, applying vigorous cooling to keep the temperature in the reactor below 40° C. (TDI is more reactive than IPDI and generates a stronger exotherm.) 35 minutes after the completion of this feed, the isocyanate content of the reaction mixture was found to be 8.2%, so the temperature was raised to 60° C. before addition of a further solution of 0.100 g Fascat 4202CL in 2.400 g methyl methacrylate. Then 102.041 g of Simulsol PTKE was fed gradually into the reactor over a period of 60 minutes, keeping the temperature in the reactor below 65° C. After completion of this feed, any residual Simulsol PTKE remaining in the feed vessel was rinsed into the reactor with a further 42.200 g of methyl methacrylate. The reactor was maintained at 60°-65° C. until the isocyanate content dropped to 0.3% (approximately 30 minutes), when 250.000 g of methyl methacrylate was stirred into the mixture and the resulting product, urethane acrylate resin UA-11, was cooled back to normal ambient temperature. The theoretical oligomer content of the solution was 70.8%.

Synthetic Example 12

This product is essentially the same composition as UA-2 (Synthetic Example 2), but made with a different order of addition of raw materials.

A continuously stirred glass reactor was charged with 235.815 g isophorone diisocyanate (IPDI) and a solution of 0.150 g inhibitor T, 0.200 g toluhydroquinone and 0.100 g benzoquinone in 2.35 g methyl methacrylate. The mixture was warmed to 45°-50° C. and a solution of 0.100 g Fascat 4202CL in 2.400 g methyl methacrylate added. After this, 94.600 g of Simulsol PTKE was fed slowly into the reactor over a period of 100 minutes, keeping the temperature in the reactor between 55° and 60° C. 40 minutes after the completion of this feed, the isocyanate content of the reaction mixture was found to be 7.33%, so the temperature was raised to 80° C. before addition of a further solution of 0.100 g Fascat 4202CL in 2.400 g methyl methacrylate. Then 369.585 g of Bisomer PPM5 was fed gradually into the reactor over a period of 105 minutes, keeping the temperature in the reactor below 85° C. After completion of this feed, any residual Bisomer remaining in the feed vessel was rinsed into the reactor with a further 42.200 g of methyl methacrylate. The reactor was maintained at 80°-85° C. until the isocyanate content dropped to 0.22% (approximately 45 minutes), when 250.000 g of methyl methacrylate was stirred into the mixture and the resulting product, urethane acrylate resin UA-12, (theoretical oligomer content 70.8%) was cooled back to normal ambient temperature.

Preparation of Adhesive Examples

Firstly, stock solutions of the polychloroprene elastomers Neoprene WB and neoprene WM-1 were prepared in methyl methacrylate by weighing 35% weight of elastomer and 65% weight of methyl methacrylate into jars which were then lidded and rotated on a laboratory roller mixer for several hours, sometimes overnight, until the elastomer had fully dissolved.

The mixer used to prepare all the adhesive examples was a Ross VMC2 high shear mixer made by Charles Ross & Son Company of Hauppauge, N.Y. This has a stainless steel mixing vessel of 5 liters capacity, fitted with a 2½ inch circular high shear dispersing blade and rotating side sweepers to prevent material from clinging to the sides of the mixing vessel instead of being mixed into the bulk of the product by the dispersing blade. When in use, the vessel is fitted with a sealed lid to prevent monomer losses during mixing.

Adhesive Example 13

Firstly, 370.1 g of methyl methacrylate was weighed into a container and 0.235 g of 1,4-naphthaquinone dissolved in it. Then 1746.0 g of the 35% Neoprene WB solution and 671.0 g of the 35% Neoprene WM-1 solution were weighed into a 5-liter plastic container, to which was added 188.0 g of urethane acrylate resin UA-2 and 611.0 g of urethane acrylate resin UA-1. The contents of the container were stirred to achieve a homogeneous mixture and then transferred to the mixing vessel of the Ross VMC2. 211.5 g of methacrylic acid, 32.9 g of Sartomer CD9053 and approximately two thirds of the 1,4 naphthaquinone solution were also added to this vessel, which was then lidded and mixed at 40 Hz disperser speed (11 Hz sweeper speed) for 10 minutes. During this time, 23.5 g of HET and 23.5 g of IGI 1977 wax were dissolved in the remaining 1,4-naphthaquinone solution via the action of heat. This solution was added to the mixing vessel at the end of the 10 minutes and mixed in for a further 5 minutes. Following this, the disperser speed was increased to 47 Hz, the sweeper speed reduced to 8 Hz and 23.27 g calcium carbonate and 799.0 g of Paraloid BTA 753 slowly added. The product adhesive A-13 could be decanted from the vessel once these components were fully mixed in, which took 45-55 minutes.

The weight percentages of the various components in A-13 are shown in Table 2. The weight percentage of methyl methacrylate shown in this Table is the combined amount from the methyl methacrylate weighed out at the start (7.9% of the total composition) and that added as part of the stock solutions (24.1% and 9.3% of the total composition respectively). Likewise, the weight percentages of the elastomers are those of the solid elastomers contained in the composition, not those of the stock solutions.

Adhesive Example 14

Adhesive example 14 is almost identical to adhesive example 13, but uses a different accelerator system. Firstly, 371.0 g of methyl methacrylate was weighed into a container and 0.235 g of 1,4-naphthaquinone dissolved in it. Then 1745.0 g of the 35% Neoprene WB solution and 671.0 g of the 35% Neoprene WM-1 solution were weighed into a 5-liter plastic container, to which was added 188.0 g of urethane acrylate resin UA-2 and 611.0 g of urethane acrylate resin UA-1. The contents of the container were stirred to achieve a homogeneous mixture and then transferred to the mixing vessel of the Ross VMC2, followed by 211.5 g of methacrylic acid and 32.9 g of Sartomer CD9053. The previously-prepared 1,4-naphthaquinone solution in methyl methacrylate was then used to rinse the CD9053 container into the mixing vessel, which was then lidded and mixed at 40 Hz disperser speed (11 Hz sweeper speed) for 10 minutes. 23.5 g of IGI 1977 wax and 23.5 g of DMPT were then added to the mixing vessel and mixed in for a further 5 minutes. Following this, the disperser speed was increased to 47 Hz, the sweeper speed reduced to 8 Hz and 23.27 g calcium carbonate and 799.0 g of Paraloid BTA 753 slowly added. The product adhesive A-14 could be decanted from the vessel once these components were fully mixed in.

The weight percentages of the various components in A-14 are also shown in Table 2.

Adhesive Example 15

This example uses a chlorinated polyethylene elastomer in place of the Neoprene elastomers.

1959.0 g of methyl methacrylate was weighed into the mixing vessel of the Ross VMC2 and the following ingredients added to it.

0.235 g of 1,4-naphthaquinone
 211.5 g of methacrylic acid
 188.0 g of urethane acrylate resin UA-2
 611.0 g of urethane acrylate resin UA-1
 32.9 g of Sartomer CD9053, rinsing the container into the vessel with 50 g of methyl methacrylate
 23.5 g of HET, dissolved in 50 g methyl methacrylate.

These ingredients were mixed together at a speed of 40 Hz, the sweepers running at a speed of 11 Hz. To this mixture was added 23.5 g of IGI 1977 wax and 728.5 g of Tyrin 3615P chlorinated polyethylene elastomer, these being mixed into the bulk for 10 minutes at 40 Hz. Following this, the disperser speed was increased to 47 Hz, the sweeper speed reduced to 8 Hz and 23.3 g calcium carbonate and 799.0 g of Paraloid BTA 753 slowly added. Mixing continued for 45 minutes or until the Tyrin was fully dissolved and the mix had a creamy consistency. The product adhesive A-15 could then be decanted from the mixing vessel. Its weight percentage composition is also shown in Table 2.

Adhesive Examples 16 to 20

These materials were prepared according to the procedure of Adhesive Example 13, the only difference being that Adhesive Example 18 was prepared using 40% stock solutions of the elastomers, rather than 35%, on account of the high elastomer content of this formulation. Their weight percentage compositions are set out in table 2.

TABLE 2

| EXAMPLE | 13 | 14 | 15 | 16 | 17 | 18 | 19 | 20 |
|---|---|---|---|---|---|---|---|---|
| PRODUCT RAW MATERIAL | A-13 | A-14 | A-15 | A-16 | A-17 | A-18 | A-19 | A-20 |
| Methyl methacrylate | 41.3 | 41.3 | 43.8 | 53.3 | 43.3 | 43.3 | 42.3 | 42.3 |
| Methacrylic acid | 4.5 | 4.5 | 4.5 | 4.5 | 4.5 | 4.5 | 4.5 | 4.5 |
| 1,4-NQ | 0.005 | 0.005 | 0.005 | 0.005 | 0.005 | 0.005 | 0.005 | 0.005 |
| Neoprene WB | 13.0 | 13.0 | — | 13.0 | 3.6 | 20.2 | 13.0 | 13.0 |

TABLE 2-continued

| EXAMPLE | 13 | 14 | 15 | 16 | 17 | 18 | 19 | 20 |
|---|---|---|---|---|---|---|---|---|
| Neoprene WM1 | 5.0 | 5.0 | — | 5.0 | 1.4 | 7.8 | 4.0 | 4.0 |
| Tyrin 3615P | — | — | 15.5 | — | — | — | — | — |
| UA-1 | 13.0 | 13.0 | 13.0 | 3.5 | 13.0 | 13.0 | — | 17.0 |
| UA-2 | 4.0 | 4.0 | 4.0 | 1.5 | 4.0 | 4.0 | — | — |
| UA-3 | — | — | — | — | — | — | 17.0 | — |
| IG 1977 | 0.5 | 0.5 | 0.5 | 0.5 | 0.5 | 0.5 | 0.5 | 0.5 |
| HET | 0.5 | — | 0.5 | 0.5 | 0.5 | 0.5 | 0.5 | 0.5 |
| DMPT | — | 0.5 | — | — | — | — | — | — |
| CD9053 | 0.7 | 0.7 | 0.7 | 0.7 | 0.7 | 0.7 | 0.7 | 0.7 |
| CaCO$_3$ | 0.495 | 0.495 | 0.495 | 0.495 | 0.495 | 0.495 | 0.495 | 0.495 |
| BTA-753 | 17.0 | 17.0 | 17.0 | 17.0 | 28.0 | 5.0 | 17.0 | 17.0 |

Comparative Example CA-21

An adhesive composition containing a blend of (meth)acrylate ester monomer, urethane acrylate resin, nitrile rubber and core-shell particles was provided for comparison.

47.0 g of 2,4,6-tris[(dimethylamino)methyl]phenol inhibitor was dissolved in 1305.4 g of methyl methacrylate in a beaker. 1634.0 g of a 25% wt solution of Nipol 1072 rubber in methyl methacrylate was then dispensed into a large plastic container and all bar ~50 ml of the inhibitor solution stirred into it. This mixture was then transferred into the stainless steel vessel of the Ross VMC2, followed by 235.0 g of methacrylic acid and 866.21 g of urethane acrylate resin UA-1. The vessel was mixed for 5 minutes at blade speed 40 Hz, sweeper speed 11 Hz before altering these speeds to 47 Hz and 8 Hz respectively and adding 39.01 g of HET, followed, slowly, by 408.9 g of Paraloid BTA 753. After 55 minutes further mixing, the product was cooled to below 32° C. with only the sweeper blades operating, at 6 Hz. 164.5 g of ethylene glycol methacrylate phosphate was then mixed with the remaining ~50 ml of inhibitor solution and stirred into the batch at 30 Hz, sweeper speed 8 Hz. After 10 minutes mixing, the product adhesive CA-21 was cooled to below 30° C. and decanted from the mixer.

Comparative Example CA-22

An adhesive composition containing a blend of (meth)acrylate ester monomer, Neoprene, orthophthalic polyester resin and core-shell particles was provided for comparison.

Firstly, a stock solution of composition 27% weight Neoprene AD-20, 1.5% methacrylic acid, 7.5% lauryl methacrylate and 64% methyl methacrylate was prepared by the usual roller mixing technique employed for making stock solutions of elastomers. (Neoprene AD-20 does not readily dissolve in methyl methacrylate alone.) 3133.0 g of this stock solution was then dispensed into a beaker and 470.0 g of an orthophthalic polyester resin (65% polyester in styrene) mixed into it before transferring this mixture to the vessel of the Ross VMC2. To this mixture was added a solution of 0.235 g of 1,4-naphthaquinone in 85.0 g of methyl methacrylate, followed by 94.0 g of dibutyl phthalate plasticiser, which were mixed in for 10 minutes at 40 Hz disperser speed, 11 Hz sweeper speed. During this time, 18.8 g of HET was dissolved in 100.0 g of methyl methacrylate via the action of heat. This solution was added to the mixing vessel at the end of the 10 minutes and mixed in for a further 5 minutes. Following this, the disperser speed was increased to 47 Hz, the sweeper speed reduced to 8 Hz and 799.0 g of Paraloid BTA 753 slowly added. This was mixed in over 55 minutes, then the batch was cooled to below 32° C. with the disperser switched off but the sweeper blades still operating at 6 Hz. The product adhesive CA-22 could then be decanted from the mixing vessel.

Comparative Example CA-23

An adhesive composition containing a blend of (meth)acrylate ester monomer, Neoprene and core-shell particles was provided for comparison.

0.235 g of 1,4-naphthaquinone was dissolved in 810.52 g methyl methacrylate. 2679.0 g of a 20% solution of Neoprene AD-20 rubber in methyl methacrylate was then dispensed into a 5-liter plastic container and the naphthaquinone solution stirred into it. The mixture was poured into the vessel of the Ross VMC2 and 235.0 g of methacrylic acid added to it before mixing for 10 minutes at speed 40 Hz, sweeper speed 11 Hz. 35.25 g of N,N-dimethyl-p-toluidine was then added and mixed in for 5 minutes. After increasing the disperser speed to 47 Hz and decreasing the sweeper speed to 8 Hz, 940.0 g of Paraloid BTA 753 was added slowly, with mixing then being continued for 55 minutes. The product adhesive CA-23 was cooled to below 32° C. with only the sweeper blades still operating, before being decanted from the mixing vessel.

Comparative Example CA-24

An adhesive composition containing a blend of (meth)acrylate ester-monomer, nitrile rubber, orthophalic polyester resin and core-shell particles was provided for comparison.

0.235 g of 1,4-naphthaquinone was dissolved in 1203.0 g methyl methacrylate. 1880.0 g of a 25% solution of Nipol DN4555 nitrile rubber in methyl methacrylate was then dispensed into a 5-liter plastic container and the naphthaquinone solution stirred into it. The mixture was poured into the vessel of the Ross VMC2 and 47.0 g of methacrylic acid, followed by 235.0 g of lauryl methacrylate, added to it before mixing for 10 minutes at speed 40 Hz, sweeper speed 11 Hz. 470.0 g of the same orthophthalic polyester as used in Comparative Example 3 was then added to the mixer, along with 18.8 g of HET. These were mixed in for 5 minutes. After increasing the disperser speed to 47 Hz and decreasing the sweeper speed to 8 Hz, 846.0 g of Paraloid BTA 753 was added slowly, with mixing then being continued for 55 minutes. The product adhesive CA-24 was cooled to below 32° C. with only the sweeper blades still operating, before being decanted from the mixing vessel.

Adhesives were initiated and specimens prepared for tensile testing as described in the Materials and Methods section. The test pieces were subjected to tensile testing according to ISO 527 (1993), referred to earlier.

TABLE 3

| ADHESIVE EXAMPLE | Tensile strength (MPA) | Tensile modulus (MPA) | Maximum elongation at break (%) | Average elongation at break (%) |
|---|---|---|---|---|
| A-13 | 18.8 | 786.0 | 70.4 | 53.8 |
| A-14 | 18.6 | 787.0 | 93.3 | 88.0 |
| CA-21 | 36.7 | 2075.0 | 14.5 | 12.8 |
| CA-22 | 20.3 | 1532.0 | 77.9 | 71.0 |
| CA-23 | 17.2 | 1085.0 | 91.6 | 68.2 |
| CA-24 | 23.3 | 1152.0 | 128.1 | 114.8 |
| A-15 | 21.2 | 1090.0 | 57.0 | 46.1 |
| A-16 | 22.7 | 911.0 | 86.2 | 78.4 |
| A-17 | 25.8 | 1311.0 | 92.9 | 83.4 |
| A-18 | 14.7 | 515.0 | 35.7 | 24.5 |
| A-19 | 19.1 | 892.0 | 51.4 | 38.5 |
| A-20 | 18.7 | 742.0 | 101.8 | 81.8 |

In simple terms, the modulus is a measure of the stiffness of the cured material. When the adhesive is being used to bond two substrates together, the strength of the bond will depend in part on the chemistry at the adhesive-substrate interface (i.e. how well the adhesive sticks to the substrate) and in part on how well mechanical forces are transmitted between adhesive and substrate when the bond is placed under stress. If a cured adhesive displays a modulus that is too high, especially if the elongation is low, this has a detrimental effect on the transmission of forces between adhesive and substrate, resulting, in some cases, in a weaker bond. The results in Table 3 need to be viewed with this in mind. Most of the adhesive moduli in this table lie in the range 700-1200 MPA and most of the elongations at break are above 50%. Comparative adhesive CA-21, however, is much stiffer, with a tensile modulus above 2000 MPA and elongation figures below 15%. It is also clear that when high levels of polychloroprene rubber are employed, necessitating the use of only small amounts of core-shell impact modifier (high levels of both would give an extremely viscous adhesive that would be impossible to mix), this combination depresses all of the measured tensile properties.

The adhesives were further tested for boiling and surface hardness, as described earlier. The results are set out in Table 4.

TABLE 4

| EXAMPLE | Surface Boil Rating | Centre Boil Rating | Surface Bead Hardness | Centre Bead Hardness |
|---|---|---|---|---|
| A-13 | 2 | 2 | 50-55 | 45-50 |
| A-14 | 1 | 1 | 65-70 | 65-70 |
| CA-21 | 1 | 2 | 25-28 | 20-25 |
| CA-22 | 4 | 3 | 65-70 | 70-72 |
| CA-23 | 5 | 5 | 35-40 | 48-52 |
| CA-24 | 3 | 3 | 60-65 | 60-65 |
| A-15 | 4 | 3 | 68-72 | 70-75 |
| A-16 | 3 | 3 | 55-60 | 65-68 |
| A-17 | 3 | 2 | 62-65 | 68-70 |
| A-18 | 2 | 2 | 48-52 | 54-56 |
| A-19 | 2 | 1 | 60-65 | 70-75 |
| A-20 | 3 | 2 | 50-55 | 54-55 |

As expected from the teaching of PCT application WO2005/040295, referenced above, CA-22 performs better on the surface boil test than the adhesive of the known art at the time of that patent, CA-23. Surprisingly, however, switching from unsaturated polyester to urethane (meth)acrylate as the reactive resin in the adhesive brings about a further improvement in controlling boiling/gassing when the adhesive is cured in a large mass. Adhesives of the invention would be especially suitable for use in the thick sections commonly used to bond large parts, whereas adhesives of the CA-23 type taught by the prior art would not.

Adhesives A-13 to A-18 all contain blends of urethane (meth)acrylate oligomers and these results illustrate that such blends are especially suitable for a 10:1 type curing system. Adhesive A-19 contains only oligomer UA-3 which is a novel oligomer in accordance with the third aspect of the present invention. This composition exhibited lower surface boil and centre boil as compared to A-20 which is a corresponding composition in which the urethane meth(acylate) oligomer was component UA-1.

The adhesives were then used to bond three different types of substrate: a metal (aluminium), a thermoset plastic (glass reinforced polyester laminate) and a thermoplastic (acrylic sheet). The shear strengths of the joints were then determined by the methods discussed in the Materials and Methods section. These are set out in Table 5, along with the failure mode of the adhesive joint.

Adh=adhesive failure, i.e. the joint fails at the adhesive-substrate interface.

Coh=cohesive failure, i.e. the joint fails within the body of the cured adhesive, not at the interface with the substrate.

Sub=substrate failure, i.e. the joint fails within the body of the substrate, not at the interface.

TABLE 5

| ADHESIVE EXAMPLE | Tensile lap shear strength (ALUMINIUM) (MPA) | Tensile lap shear strength (GRP) (MPA) | Compressive lap shear strength (ACRYLIC) (MPA) |
|---|---|---|---|
| A-13 | 19.4 Coh | 9.1 Coh/Sub | 19.9 Coh (<2% Sub) |
| A-14 | 21.0 Coh | 8.1 Coh/Sub | 14.2 Sub |
| CA-21 | 25.8 Adh | 6.6 Sub | 22.1 Sub/Adh |
| CA-22 | 16.4 Adh | 9.3 Sub | 26.4 Coh/Sub |
| CA-23 | 18.4 Adh | 8.1 Sub | 24.4 Sub/Adh |
| CA-24 | 5.1 Adh | 8.0 Sub | 22.4 Sub/Adh |
| A-15 | 21.3 Coh (<30% Adh) | 7.6 Sub (<5% Coh) | 21.7 Sub/Adh |
| A-16 | 19.8 Coh | 11.4 Sub (<5% Coh) | 21.6 Coh/Adh |
| A-17 | 19.7 Coh | 7.6 Sub | 19.7 Sub/Coh/Adh |
| A-18 | 23.8 Coh | 9.1 Sub (<5% Coh) | 19.1 Sub/Coh |
| A-19 | 17.3 Coh | 7.9 Sub | 19.2 Sub/Coh |
| A-20 | 16.1 Coh | 8.8 Sub (<5% Coh) | 18.1 Coh |

The adhesives of the invention perform well on all three substrates illustrating the enhanced versatility provided by adhesives in accordance with the present invention.

The prior art adhesive CA-24 gives inferior performance on aluminium, showing that although this technology is capable of bonding well to plastics, it is less appropriate for bonding to metals. The prior art adhesive CA-21, however, appears less suitable for bonding to glass reinforced polyester. Without wishing to be bound by theory, the inferior performance of CA-21 in bonding GRP is believed to be a consequence of this adhesive's relatively high tensile modulus and low elongation in the cured state (see Table 3 above). The greater stiffness and lesser extensibility of this formulation impairs the transfer of stresses between substrate and adhesive when the joint is put under load, resulting in the failure of the substrate at a lower value than those observed for other adhesives with lower tensile moduli and greater elongations at break.

The above results also show that adhesive A-19, which contained the novel oligomer UA-3 according to the third aspect of the invention, also exhibited enhanced adhesion to the acrylic and aluminium substrates, as compared to adhesive A-20 which contained a known urethane (meth)acrylate oligomer UA-1.

The difference in the mechanism of failure for bonds to aluminium between adhesives according to the invention and those of the prior art should also be noted. Adhesives according to the invention display cohesive failure, i.e. within the body of the adhesive itself, whereas those of the prior art display adhesive failure, i.e. failure at the adhesive-substrate interface. It is generally accepted by those skilled in the art that cohesive failure is preferable to adhesive failure, as adhesive failure demonstrates a deficiency in the adhesive's ability to bond to the substrate, a deficiency that may cause the bond to fail under more aggressive conditions. One example of more aggressive conditions would be exposure of the adhesive joint to a corrosive environment. To demonstrate this, adhesive joints to aluminium were prepared in the same way as before using adhesives A-13, CA-21, CA-22 and CA-23. These joints were then placed in a salt spray cabinet for 7 days before determination of lap shear strengths. These data are set out in Table 6.

TABLE 6

| EXAMPLE | Tensile lap shear strength (MPA) (Aluminium, 7 days salt spray) |
|---|---|
| A-13 | 10.9 Coh/Adh |
| CA-21 | 3.3 Adh |
| CA-22 | 0.6 Adh |
| CA-23 | 11.35 Adh |

The prior art compositions CA-21 and CA-22 have clearly failed under these harsher conditions. Only the adhesive according to the invention and the prior art composition CA-23 have maintained their adhesive strength in the corrosive environment.

In addition A-13 shows a combination of "cohesive" and "adhesive" failure, whereas the comparative adhesive CA-23 shows "adhesive" failure, which is less favourable.

Adhesive Examples 25 to 33

Adhesives A-25 to A-33 were prepared in exactly the same manner as adhesive A-13 of Adhesive Example 13, except that, in each case, the urethane acrylate resin UA-2 was replaced by the same quantity of each of urethane acrylate resins UA-4 to UA-12; the novel urethane (meth)acrylate resins illustrate the third aspect of the present invention. These were cured with 2% of Perkadox BM-50R paste, being cast as previously described, and the tensile properties of the cured adhesives determined as for adhesive examples A-13 to A-20 and CA-21 to CA-24. The results are set out in Table 7.

TABLE 7

| ADHESIVE | URETHANE (METH) ACRYLATE | Tensile Strength (MPA) | Tensile Modulus (MPA) | Maximum Elongation at break (%) | Average Elongation at break (%) |
|---|---|---|---|---|---|
| A-25 | UA-4 | 21.9 | 936.0 | 79.4 | 71.3 |
| A-26 | UA-5 | 19.9 | 810.0 | 61.8 | 57.5 |
| A-27 | UA-6 | 22.1 | 927.0 | 88.8 | 79.4 |
| A-28 | UA-7 | 22.9 | 1005.0 | 90.0 | 82.6 |
| A-29 | UA-8 | 20.8 | 979.0 | 94.6 | 81.7 |
| A-30 | UA-9 | 21.7 | 1441.0 | 84.0 | 74.9 |
| A-31 | UA-10 | 22.1 | 1015.0 | 90.6 | 77.6 |

TABLE 7-continued

| ADHESIVE | URETHANE (METH) ACRYLATE | Tensile Strength (MPA) | Tensile Modulus (MPA) | Maximum Elongation at break (%) | Average Elongation at break (%) |
|---|---|---|---|---|---|
| A-32 | UA-11 | 22.0 | 950.0 | 95.8 | 79.0 |
| A-33 | UA-12 | 21.6 | 879.0 | 80.6 | 75.2 |

The novel urethane (meth)acrylate resins exhibit an average elongation at break of at least 50% and most exhibit an adhesive modulus in the range of 700-1200 MPA.

The two most preferred modes of the invention, being adhesives A-13 and A-14, were then demonstrated as suitable for bonding a wider range of metallic and non-metallic substrates. They were cured, as previously, with 2% of 50% benzoyl peroxide paste, as previously, and lap shear tests were performed in the same fashion as before. The results are set out in Table 8. (Tests on metals are tensile, those on thermoplastics are compressive, all results in MPA.)

TABLE 8

| ADHESIVE | A-13 | A-14 |
|---|---|---|
| Stainless steel | 18.1 Coh/Adh | 15.5 Adh/Coh |
| Abraded cold rolled steel | 18.2 Coh | 16.1 Coh |
| ABS | 13.6 Coh/Sub | 14.3 Coh/Sub |
| PVC | 16.1 Sub/Adh | 14.2 Sub |

The adhesives A-13 to A-33 and comparative adhesives CA-21 to CA-24 described above were all cured with the "10:1 cure system" of benzoyl peroxide+tertiary aromatic amine to generate the test results laid out in Tables 3 to 8. In order to demonstrate that the adhesives of the invention are adaptable to the "1:1 cure system" of cumene hydroperoxide+sulphonyl chloride+dihydropyridine, two further adhesive examples were prepared. Adhesive example 34 is a version of adhesive example 13, adapted for cure with the 1:1 cure system, whilst comparative example 35 is a version of comparative example 21, also adapted for use with the 1:1 cure system.

Adhesive Example 34

11.75 g of BHT was dissolved in 1043.42 g of methyl methacrylate. Then 1477.1 g of a 35% stock solution of Neoprene WB plus 894.5 g of a 35% stock solution of Neoprene WM-1 were weighed into a 5-liter plastic container and all but around 40 g of the previously-prepared BHT solution added. The container was stirred gently to mix its contents before these were charged to the mixing vessel of the Ross VMC2, followed by 188.8 g of methacrylic acid, 2.35 g of EDTA solution and 20.68 g of 2-toluenesulphonyl chloride. The contents of the vessel were mixed for 10 minutes at 40 Hz disperser speed, 11 Hz sweeper speed, before adding 23.5 g of IGI 1977 wax, 211.5 g of urethane acrylate resin UA-1 and 35.25 g of maleic acid which had been ground to a fine powder. Mixing continued at 47 Hz disperser speed, 8 Hz sweeper speed for 5 minutes, after which 16.45 g of Halox ZPLEX 111, 11.75 g calcium carbonate powder and 705.0 g of Paraloid BTA 753 was added slowly. After 55 minutes further mixing, the batch was allowed to cool to below 32° C. with the disperser switched off but the sweeper blades still operating at 6 Hz. After cooling, 32.9 g of Sartomer CD9053 mixed with the remaining ~40 g of BHT solution in methyl methacrylate was added, followed by 25.85 g of cumene hydroperoxide. These final ingredients were mixed in for 10 minutes at 30 Hz disperser speed, 8 Hz sweeper speed, while applying cooling to the mixing vessel. Cooling then continued with the sweeper blades running at 6 Hz until the temperature of the batch dropped below 30° C., when the product adhesive A-34 could be decanted from the mixing vessel.

Comparative Example CA-35

An adhesive composition containing a blend of (meth) acrylate ester monomer, nitrile rubber, urethane acrylate resin and core-shell particles was provided for comparison.

18.8 g of 2,6-di-cert-butyl-p-cresol inhibitor was dissolved in 1495.5 g of methyl methacrylate in a beaker. 1654.4 g of a 25% wt solution of Nipol 1072 rubber in methyl methacrylate was then dispensed into a large plastic container and all bar ~50 ml of the inhibitor solution stirred into it. This mixture was then transferred into the stainless steel vessel of the Ross VMC2, followed by 235.0 g of methacrylic acid, 18.8 g of p-toluenesulphonyl chloride and 674.2 g of urethane acrylate resin UA-1. The vessel was mixed for 5 minutes at blade speed 40 Hz, sweeper speed 11 Hz before altering these speeds to 47 Hz and 8 Hz respectively and slowly adding 413.4 g of Paraloid BTA 753. After 55 minutes further mixing, the product was cooled to below 32° C. with only the sweeper blades operating, at 6 Hz. 166.4 g of ethylene glycol methacrylate phosphate was then mixed with the remaining ~50 ml of inhibitor solution and stirred into the batch at 30 Hz, sweeper speed 8 Hz, along with 23.5 g of cumene hydroperoxide. After 10 minutes mixing, the product adhesive CA-35 was cooled to below 30° C. and decanted from the mixer.

These two adhesives were cured with 1.1% wt. Reillcat ASY-2 plus 0.4% wt. of a copper (II) acetylacetonate solution containing 0.05% wt. of copper (i.e. 98.5 g A-34 (or CA-35) plus 1.1 g ASY-2 plus 0.4 g copper (II) acetylacetonate). The tensile properties and lap shear strengths on various substrates were then determined in the same way as those in Tables 3 and 5 respectively. The results are presented in Table 10.

Adhesive Example 36

Adhesive A-36, showing the effect of using a novel urethane (meth)acrylate oligomer in a 1:1 type of adhesive composition, was prepared by a procedure analogous to that used in Example 34 to prepared Adhesive A-34. The weight percentage quantities of the components in adhesive A-36 are shown in Table 9, which also shows the weight percentage quantities of the components in adhesive A-34, for the purpose of comparison.

TABLE 9

| COMPONENT | ADHESIVE A-34 | ADHESIVE A-36 |
|---|---|---|
| Methyl methacrylate | 54.16 | 49.50 |
| Methacrylic acid | 3.96 | 4.45 |
| Ethanox 4703 | — | 0.01 |
| Annulex BHT | 0.25 | 0.37 |
| Neoprene WB | 10.83 | 7.20 |
| Neoprene WM-1 | 6.56 | 3.45 |
| Benzoflex 9-88 | — | 4.95 |
| EDTA solution | 0.05 | 0.50 |
| p-Toluenesulphonyl chloride | 0.43 | 0.44 |
| IG 1977 wax | 0.50 | 0.37 |
| UA-1 | 4.43 | — |
| UA-2 | — | 4.95 |
| Maleic acid | 0.74 | 0.74 |

TABLE 9-continued

| COMPONENT | ADHESIVE A-34 | ADHESIVE A-36 |
|---|---|---|
| Pigment paste | — | 0.01 |
| Halox ZPLEX 111 | 0.34 | 1.00 |
| Calcium carbonate | 0.25 | 1.00 |
| BTA-753 | 14.77 | 18.05 |
| CD9053 | 0.69 | 0.69 |
| Cumene hydroperoxide | 0.54 | 0.50 |
| Wacker HDK-N20 | — | 0.62 |
| SUB-TOTAL | 98.50 | 98.80 |
| CURE SYSTEM | | |
| Reillcat ASY-2 | 1.10 | 1.15 |
| Copper acetylacetonate | 0.40 | — |
| Cobalt octoate (12%) | — | 0.05 |
| GRAND TOTAL | 100.00 | 100.00 |

The test methods used for adhesive A-36 are the same as used for A-34 and A-35, with the one small exception that for the lap shear tests on GRP and acrylic, the substrate was wiped with aqueous alcohol rather than acetone.

The results are presented in Table 10.

TABLE 10

| ADHESIVE | A-34 | A-36 | CA-35 |
|---|---|---|---|
| Tensile strength (MPA) | 21.4 | 23.2 | 35.5 |
| Tensile modulus (MPA) | 1427.6 | 1381.0 | 2001.0 |
| Max. elongation at break (%) | 30.5 | 47.5 | 31.2 |
| Avge. Elongation at break (%) | 20.5 | 44.0 | 28.9 |
| Tensile lap shear str. (aluminium) (MPA) | 25.1 Coh | 22.6 Coh | 23.8 Adh |
| Tensile lap shear str. (GRP) (MPA) | 10.2 Sub | 7.9 Sub | 5.6 Sub |
| Compressive lap shear str. (acrylic) (MPA) | 22.4 Sub | 22.2 Adh (20% Coh) | 20.5 Sub/Adh |

The adhesive composition A-34 exhibited enhanced lap shear strength, as compared to CA-35 for all substrates tested. These results illustrate the enhanced properties arising from an adhesive composition containing a urethane (meth)acrylate oligomer and a chlorinated elastomeric polymer as compared to a composition containing the combination of urethane (meth)acrylate oligomer and a nitrile rubber.

The adhesive composition A-36 exhibited enhanced lap shear strength, as compared to CA-35, for the GRP and acrylic substrates. The above results illustrate enhanced properties arising from the combination of chlorinated elastomeric polymer and urethane (meth)acrylate oligomer, as compared to the combination of nitrile rubber and urethane (meth)acrylate oligomer, in a (meth)acrylate adhesive composition.

The invention claimed is:

1. An adhesive composition, curable via free radical polymerisation, the composition comprising, based on the total weight of components (A), (B), (C) and (D):
(A) from 35% to 65% (meth)acrylate ester monomer(s), at least 70 wt % of which is methyl methacrylate;
(B) from 3 to 32% chlorinated elastomeric polymer(s) selected from chlorinated polyethylenes and polychloroprenes;

(C) from 10 to 35% core-shell impact modifier(s), provided that the combined amount of (B) and (C) is in the range of 30 to 45 wt %; and (D) from 1% to 20% urethane (meth)acrylate oligomer(s), wherein the urethane (meth)acrylate oligomer (D) is derived from:

(i) a di- or higher isocyanate having at least two isocyanate groups;

(ii) a branched chain-extending reagent which has at least three hydroxyl groups, each capable of reaction with an isocyanate group of (i), which is selected from a polyester polyol and a polyether polyol; and (iii) a hydroxymethacrylate component or hydroxyacrylate component.

2. An adhesive composition according to claim 1, wherein the diisocyanate is selected from isophorone diisocyanate and 2,4-toluene diisocyanate.

3. An adhesive composition according to claim 1, wherein the chain-extending reagent (ii) is a polyester polyol capable of being obtained by at least one selected from (a) and (b):

(a) by polymerisation of a lactone; and (b) by polymerization of a caprolactone selected from γ-caprolactone, δ-caprolactone, and ε-caprolactone.

4. An adhesive composition according to claim 3 wherein the chain-extending reagent (ii) is derived from at least one selected from (a) and (b):

(a) ε-caprolactone and a tri or higher functional alcohol; and (b) ε-caprolactone and a sugar alcohol.

5. An adhesive composition according to claim 1, wherein the chain-extending reagent (ii) is a polyether polyol selected from ethoxylated and propoxylated derivatives of at least one selected from (a) and (b):

(a) tri- or higher functional polyols; and (b) tri- or tetra functional polyols.

6. An adhesive composition according to claim 5, wherein the chain-extending reagent (ii) is a polyether polyol selected from ethoxylated and propoxylated derivatives of trimethylol propane and ethoxylated and propoxylated derivatives of pentaerythritol, and wherein the chain-extending reagent (ii) contains from 3 to 20 units of ethylene oxide (EO), propylene oxide (PO) or combinations thereof.

7. An adhesive composition according to claim 1, wherein the hydroxyl(meth)acrylate (iii) is selected from a polyethylene glycol methacrylate and polypropylene glycol methacrylate.

8. An adhesive composition according to claim 7, wherein the polyethylene glycol methacrylate or polypropylene glycol methacrylate contains from 3 to 10 units of ethylene oxide (EO), propylene oxide (PO), or combinations thereof.

9. An adhesive composition according to claim 7, wherein the urethane (meth)acrylate oligomer (D) is derived from:

(i) a diisocyanate selected from isophorone diisocyanate and 2,4-toluene diisocyanate;

(ii) a polyol selected from ethoxylated and propoxylated derivatives of trimethylol propane and ethoxylated and propoxylated derivatives of pentaerythritol; and (iii) a polyethylene glycol mono(meth)acrylate or a polypropylene glycol mono(meth)acrylate.

10. An adhesive composition according claim 1, which includes as component (D) a blend of urethane (meth)acrylate oligomers the blend comprising (a) at least one first oligomer derived from a polyester polyol chain-extending reagent and (b) at least one second oligomer derived from a polyether polyol chain-extending reagent, in a ratio of (a):(b) of 10:1 to 1:10.

11. An adhesive composition according claim 1, wherein the chlorinated elastomeric polymer (B) is polychloroprene.

12. An adhesive composition according to claim 1, which comprises one or more of the following additional components:

an acid-functional ethylenically unsaturated monomer;
an unsaturated phosphate-containing monomer;
a chelating agent;
a wax; and
a viscosity control agent.

13. A two part system for an adhesive which comprises first and second parts, which, in combination contain components (A), (B), (C) and (D) as defined in claim 1, together with (I) a component capable of initiating free radical polymerisation of components (A) to (D); and (P) a component capable of promoting the polymerisation, provided that (I) and (P) are contained in different respective parts of the two part system.

\* \* \* \* \*